United States Patent [19]

Shinozaki et al.

[11] Patent Number: 5,476,903
[45] Date of Patent: Dec. 19, 1995

[54] PREPOLYMERIZED CATALYST, CATALYST FOR OLEFIN POLYMERIZATION, POLYMERIZATION PROCESS OF OLEFIN, AND OLEFIN POLYMER

[75] Inventors: Tetsunori Shinozaki; Mamoru Kioka, both of Yamaguchi, Japan

[73] Assignee: Mitsui Petrochemical Industries, Ltd., Tokyo, Japan

[21] Appl. No.: 195,469

[22] Filed: Feb. 14, 1994

Related U.S. Application Data

[63] Continuation-in-part of Ser. No. 102,882, Aug. 6, 1993, abandoned, which is a continuation-in-part of Ser. No. 929,427, Aug. 14, 1992, abandoned.

[30] Foreign Application Priority Data

| Aug. 14, 1991 | [JP] | Japan | 3-204464 |
| Aug. 14, 1991 | [JP] | Japan | 3-204465 |
| Aug. 14, 1991 | [JP] | Japan | 3-204466 |
| Aug. 14, 1991 | [JP] | Japan | 3-204467 |

[51] Int. Cl.$^6$ ..................... C08L 9/00
[52] U.S. Cl. ............... 525/232; 525/313; 525/314; 526/340.3; 526/348.2; 526/348.3; 526/904
[58] Field of Search .................. 525/232, 313, 525/314; 526/340.3, 904, 348.2, 348.3

[56] References Cited

U.S. PATENT DOCUMENTS

| 4,407,998 | 10/1983 | Duvdevani | 524/229 |
| 4,833,195 | 5/1989 | Adur et al. | 524/528 |
| 4,874,734 | 10/1990 | Kioka et al. | 502/104 |
| 4,987,193 | 1/1991 | Gotoh | 525/313 |
| 5,021,382 | 6/1991 | Malpass, Jr. | 502/117 |
| 5,077,341 | 12/1991 | Saito et al. | 525/270 |

FOREIGN PATENT DOCUMENTS 0424145  4/1991  European Pat. Off. .

*Primary Examiner*—David W. Wu
*Attorney, Agent, or Firm*—Sherman and Shalloway

[57] ABSTRACT

The olefin polymer of the invention is an α-olefin/polyene copolymer-containing olefin polymer comprising (i) an α-olefin/polyene copolymer and (ii) an olefin polymer, wherein the polyene is an aliphatic polyene having 7 or more carbon atoms and having an olefinic double bond at both terminals, and the α-olefin/polyene copolymer contains constituent units derived from the α-olefin in an amount of 99.999 to 70 mol % and contains constituent units derived from the polyene in an amount of 0.001 to 30 mol %, the olefin polymer (ii) is a polymer of olefin having 3 or more carbon atoms, the α-olefin/polyene copolymer-containing olefin polymer comprises the α-olefin/polyene copolymer (i) in an amount of 0.001 to 15% by weight and the olefin polymer (ii) in an amount of 99.999 to 85% by weight, and the α-olefin/polyene copolymer-containing olefin polymer is obtained by using a prepolymerized catalyst containing the α-olefin/polyene copolymer.

17 Claims, 1 Drawing Sheet

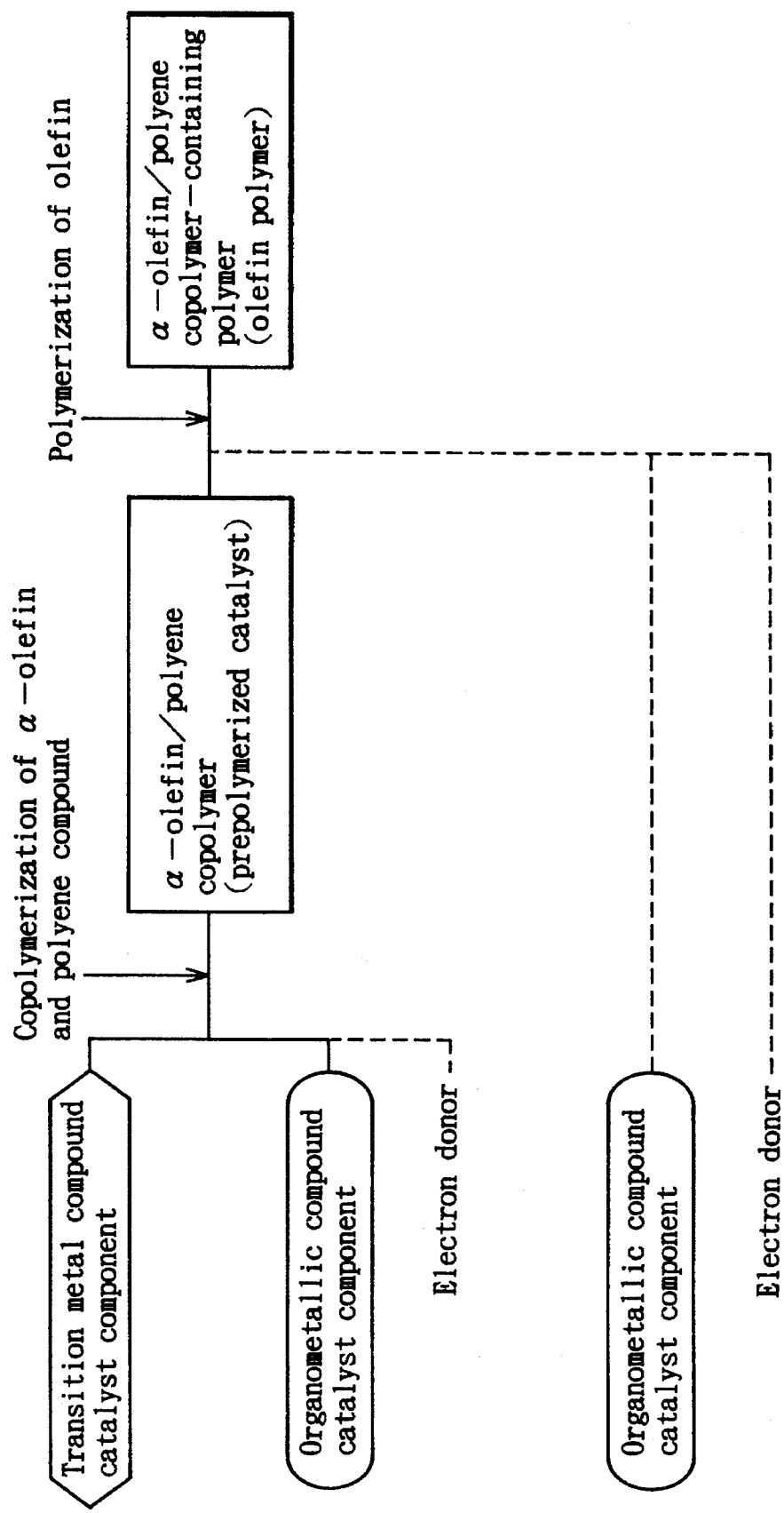

PREPOLYMERIZED CATALYST, CATALYST FOR OLEFIN POLYMERIZATION, POLYMERIZATION PROCESS OF OLEFIN, AND OLEFIN POLYMER

This application is a continuation-in-part of application Ser. No. 08.102,882, filed Aug. 6, 1993, now abandoned, which is a continuation-in-part of application Ser. No. 07/929,427, filed Aug. 14, 1992, now abandoned and priority is claimed therefrom.

FIELD OF THE INVENTION

The present invention relates to a prepolymerized catalyst capable of preparing an olefin in polymer having a high melt tension, a catalyst for olefin polymerization and a polymerization process of olefin. The invention also relates to an olefin polymer having a high melt tension and capable of being molded by blow molding, vacuum molding or the like.

BACKGROUND OF THE INVENTION

Olefin polymers such as polypropylene, high-density polyethylene, linear low-density polyethylene (LLDPE) and the like are excellent in not only transparency but also mechanical strength such as rigidity and impact strength, and have been conventionally molded into films by means of inflation molding, injection molding, extrusion molding, etc.

Such olefin polymers as mentioned above generally are low in the melt tension (MT), so that it is difficult to mold them into large capacity containers (e.g., bottles) for example by blow molding or into liners of electrical appliances for example by a vacuum molding. By those restrictions in the molding processes, the resulting molded products are also restricted. That is, the use applications of the olefin polymers are restricted in spite that they have various excellent properties.

Further, as for polypropylene, there are such problems that a phenomenon of drawdown occurs and molding conditions are restricted when polypropylene is molded into a film by an inflation molding, because of its low melt tension. For coping with those problems, a method of adding a high-pressure low-density polyethylene or the like to polypropylene is carried out in the conventional inflation molding process to increase the melt tension thereby to stabilize bubbles. However, this method sometimes induces decrease of the film strength and decrease of a film transparency.

Accordingly, if olefin polymers (e.g., polypropylene) having a high melt tension are developed, it becomes possible to form large capacity containers such as bottles by a blow molding and to form liners of electrical appliances by a vacuum molding from those polymers, and hence the use applications of the olefin polymers can be much more extended.

Further, when the olefin polymers having a high melt tension are molded into films by means of an inflation molding, the bubbles can be stabilized and the molding speed can be made higher.

For these reasons, an advent of olefin polymers such as polypropylene, high-density polyethylene and linear low-density polyethylene having high melt tension has been eagerly desired.

The present inventors have studied the olefin polymers of high melt tension to comply with the above-mentioned requirements, and as a result, they have found that an olefin polymer of high melt tension can be obtained by polymerizing olefin in the presence of a catalyst for olefin polymerization comprising a novel prepolymerized catalyst which is obtained by copolymerizing an α-olefin and a polyene compound to a catalyst which comprises a transition metal compound catalyst component and an organometallic compound catalyst component, and accomplished the present invention.

OBJECT OF THE INVENTION

The object of the present invention is to provide a novel prepolymerized catalyst capable of preparing an olefin polymer having a high melt tension, a catalyst for olefin polymerization comprising the prepolymerized catalyst, a polymerization process of olefin, and an olefin polymer having a high melt tension and being excellent in rigidity, mechanical strength, impact strength and transparency.

SUMMARY OF THE INVENTION

There is provided by the present invention a prepolymerized catalyst [I] which is obtained by prepolymerizing an α-olefin and a polyene compound to a catalyst comprising

[A] a transition metal compound catalyst component, and

[B] an organometallic compound catalyst component containing a metal selected from metals in Group I to Group III of the periodic table, in the total amounts of the α-olefin and the polyene compound of 0.01 to 2,000 g per 1 g of the transition metal compound catalyst component.

There is also provided by the invention a catalyst for olefin polymerization comprising

[I] the above-mentioned prepolymerized catalyst; and

[II] an organometallic compound catalyst component containing a metal selected from metals in Group I to Group III of the periodic table.

This catalyst for olefin polymerization contains an electron donor [III] in the case of necessity, in addition to the prepolymerized catalyst [I] and the organometallic compound catalyst component [II].

The polymerization process of olefin according to the invention comprises polymerizing or copolymerizing olefin in the presence of the above-mentioned catalyst for olefin polymerization.

The olefin polymer according to the invention is an α-olefin/polyene copolymer-containing olefin polymer which comprises (i) an α-olefin/polyene copolymer and (ii) an olefin polymer wherein the polyene is an aliphatic polyene having 7 or more carbon atoms and having an olefinic double bond at both terminals, and the α-olefin/polyene copolymer contains constituent units derived from the α-olefin in an amount of 99.999 to 70 mol % and contains constituent units derived from the polyene in an amount of 0.001 to 30 mol %, the olefin polymer (ii) is a polymer of olefin having 3 or more carbon atoms, the α-olefin/polyene copolymer-containing olefin polymer comprises the α-olefin/polyene copolymer (i) in an amount of 0.001 to 15% by weight and the olefin polymer (ii) in an amount of 99.999 to 85% by weight, and the α-olefin/polyene copolymer-containing olefin polymer is obtained by using a prepolymerized catalyst containing the α-olefin/polyene copolymer.

Such olefin polymer can be prepared, for example, by polymerizing or copolymerizing olefin to the above-mentioned prepolymerized catalyst [I].

The olefin polymer according to the invention has a high melt tension.

BRIEF DESCRIPTION OF THE DRAWING

FIG. 1 is a view illustrating steps of a process for preparing an olefin polymer using a prepolymerized catalyst [I] of the present invention.

DETAILED DESCRIPTION OF THE INVENTION

The prepolymerized catalyst, the catalyst for olefin polymerization, the polymerization process of olefin and the olefin polymer according to the present invention are described in detail hereinafter.

The term "polymerization" used in the invention sometimes means not only "homopolymerization" but also "copolymerization", and the term "polymer" used in the invention sometimes means not only "homopolymer" but also "copolymer".

In FIG. 1, the steps of a process for preparing an olefin polymer using the prepolymerized catalyst [I] of the invention are illustrated.

At first, the transition metal compound catalyst component [A] used for forming the prepolymerized catalyst [I] of the invention is described.

The transition metal compound catalyst component [A] used in the invention is a compound containing a transition metal selected from metals in Group III to Group VIII of a periodic table, and preferably is a compound containing at least one transition metal selected from Ti, Zr, Hf, Nb, Ta, Cr and V.

Examples of such transition metal compound catalyst component [A] include a variety of known catalyst components, and concretely are solid titanium catalyst components containing titanium and halogen. More particularly, one example of the solid titanium catalyst components is a solid titanium catalyst component [A-1] containing titanium, magnesium and halogen, and further containing an electron donor (a) if necessary.

Processes for preparing the solid titanium catalyst component [A-1] are described in detail in the following publications.

That is, the processes are described, for example, in Japanese Patent Publications No. 46(1971)-34092, No. 53(1978)-46799, No. 60(1985)-3323 and No. 63(1988)-54289, Japanese Patent Laid-open Publications No. 1(1989)-261404 and No. 1(1989)-261407, Japanese Patent Publications No. 47(1972)-41676, No. 47(1972)-46269 and No. 48(1973)-19794, Japanese Patent Laid-open Publications No. 60(1985)-262803, No. 59(1984)-147004, No. 59(1984)-149911, No. 1(1989)-201308, No. 61(1986)-151211, No. 53(1978)-58495, No. 53(1978)-87990, No. 59(1984)-206413, No. 58(1983)-206613, No. 58(1983)-125706, No. 63(1988)-68606, No. 63(1988)-69806, No. 60(1985)-81210, No. 61(1986)-40306, No. 51(1976)-281189, No. 50(1975)-126590 and No. 51(1976)-92885, Japanese Patent Publications No. 57(1982)-45244, No. 57(1982)-26613 and No. 61(1986)-5483, Japanese Patent Laid-open Publication No. 56(1981)-811, Japanese Patent Publications No. 60(1985)-37804 and No. 59(1984)-50246, Japanese Patent Laid-open Publications No. 58(1983)-83006, No. 48(1973)-16986, No. 49(1974)-65999 and No. 49(1974)86482, Japanese Patent Publications No. 56(1981)-39767 and No. 56(1981)-32322, and Japanese Patent Laid-open Publications No. 55(1980)-29591, No. 53(1978)-146292, No. 57(1982)-63310, No. 57(1982)-63311, No. 57(1982)-63312, No. 62(1987)-273206, No. 63(1988)-69804, No. 61(1986)-21109, No. 63(1988)-264607, No. 60(1985)-23404, No. 60(1985)-44507, No. 60(1985)-158204, No. 61(1986)-55104, No. 2(1990)-28201, No. 58(1983)-196210, No. 64(1989)-54005, No. 59 (1984)-149905, No. 61(1986)-145206, No. 63(1988)-302, No. 63(1988)-225605, No. 64(1989)-69610, No. 1(1989)-168707, No. 62(1987)-104810, No. 62(1987)-104811, No. 62(1987)-104812 and No. 62(1987)-104813.

The solid titanium catalyst component [A-1] can be prepared by using for example a titanium compound, a magnesium compound and if desired an electron donor (a), and bringing them into contact with each other.

Examples of the titanium compounds employable for preparing the solid titanium catalyst component [A-1] include tetravalent titanium compounds and trivalent titanium compounds.

As the tetravalent titanium compounds, there can be mentioned compounds represented by the following formula:

$$Ti(OR)_gX_{4-g}$$

wherein R is a hydrocarbon group, X is a halogen atom, and g is a number satisfying the condition of $0 \leq g \leq 4$.

Concrete examples of such compounds are described below.

Titanium tetrahalides such as $TiCl_4$, $TiBr_4$ and $TiI_4$
Alkoxytitanium tribalides such as:
$Ti(OCH_3)Cl_3$,
$Ti(OC_2H_5)Cl_3$,
$Ti(On-C_4H_9)Cl_3$,
$Ti(OC_2H_5)Br_3$, and
$Ti(O-iso-C_4H_9)Br_3$
Dialkoxytitanium dihalides such as:
$Ti(OCH_3)_2Cl_2$,
$Ti(OC_2H_5)_2Cl_2$,
$Ti(On-C_4H_9)_2Cl_2$, and
$Ti(OC_2H_5)_2Br_2$
Trialkoxytitanium monohalides such as:
$Ti(OCH_3)_3Cl$,
$Ti(OC_2H_5)_3Cl$,
$Ti(On-C_4H_9)_3Cl$, and
$Ti(OC_2H_5)_3Br$
Tetraalkoxytitaniums such as:
$Ti(OCH_3)_4$,
$Ti(OC_2H_5)_4$,
$Ti(On-C_4H_9)_4$,
$Ti(O-iso-C_4H_9)_4$, and
$Ti(O-2-ethylhexyl)_4$ Of these, preferred are titanium tetrahalides, and particularly preferred is titanium tetrachloride. These titanium compounds may be used singly or in combination. Further, they can be used after diluting them in hydrocarbons or halogenated hydrocarbons.

As the trivalent titanium compound, titanium trichloride is employed.

Preferably used titanium trichloride is that obtained by bringing titanium tetrachloride into contact with hydrogen, a metal (e.g., magnesium metal, aluminum metal and titanium metal) or an organometallic compound (e.g., organomagnesium compound, organoaluminum compound and organozinc compound) so as to be reduced.

The magnesium compounds employable for preparing the solid titanium catalyst component [A-1] may or may not have reducing ability.

An example of the magnesium compounds having reducing ability is a compound represented by the following formula:

$$X_n MgR_{2-n}$$

wherein n is a number satisfying the condition of $0 \leq n \leq 2$; R is hydrogen, an alkyl group of 1–20 carbon atoms, an aryl group or a cycloalkyl group; when n is 0, two of R may be the same or different from each other; and X is halogen.

Concrete examples of the organomagnesium compounds having reducing ability include:

dialkylmagnesium compounds such as dimethylmagnesium, diethylmagnesium, dipropylmagnesium, dibutylmagnesium, diamylmagnesium, dihexylmagnesium, didecylmagneisum, octylbutylmagnesium and ethylbutylmagnesium;

alkylmagnesium halides such as ethylmagnesium chloride, propylmagnesium chloride, butylmagnesium chloride, hexylmagnesium chloride and amylmagnesium chloride;

alkylmagnesium alkoxides such as butylethoxymagnesium, ethylbutoxymagnesium and octylbutoxymagnesium; and butylmagnesium hydride.

Concrete examples of the magnesium compounds not having reducing ability include:

magnesium halides such as magnesium chloride, magnesium bromide, magnesium iodide and magnesium fluoride;

alkoxymagnesium halides such as methoxymagnesium chloride, ethoxymagnesium chloride, isopropoxymagnesium chloride, butoxymagnesium chloride and octoxymagnesium chloride;

aryloxymagnesium halides such as phenoxymagnesium chloride and methylphenoxymagnesium chloride;

alkoxymagnesiums such as ethoxymagnesium, isopropoxymagnesium, butoxymagnesium, n-octoxymagnesium and 2-ethylhexoxymagnesium;

aryloxymagnesiums such as phenoxymagnesium and dimethylphenoxymagnesium; and carboxylic acid salts of magnesium such as magnesium laurate and magnesium stearate.

Also employable as the magnesium compound not having reducing ability are other magnesium metals and hydrogenated magnesium.

The above-mentioned magnesium compounds not having reducing ability may be compounds derived from the aforementioned magnesium compounds having reducing ability or compounds derived during the preparation of the catalyst components. In order to derive the magnesium compounds not having reducing ability from the magnesium compounds having reducing ability, for example, the magnesium compounds having reducing ability are brought into contact with polysiloxane compounds, halogen-containing silane compounds, halogen-containing aluminum compounds, esters, alcohols, halogen-containing compounds or compounds having an OH group or an active carbon-oxygen bond.

The above-mentioned magnesium compounds having or not having reducing ability may be form the later-described organometallic compounds such as complex compounds with other metals (e.g., aluminum, zinc, boron, beryllium, sodium and potassium) and complex compounds therewith, or may be in the form of a mixture with other metal compound. Further, the magnesium compounds may be used singly or in combination of two or more kinds of the above-mentioned compounds. Moreover, the magnesium compounds may be used either in the liquid form or in the solid form. When the used magnesium compound is solid, the compound can be changed to liquid state using alcohols, carboxylic acids, aldehydes, amines, metallic acid esters, etc. which are described later as electron donors (a).

Other various magnesium compounds than the above-mentioned ones can be also employed for preparing the solid titanium catalyst component [A-1], but preferred are those in the form of halogen-containing magnesium compounds in the finally obtained solid titanium catalyst component [A-1]. Accordingly, if a magnesium compound not containing halogen is used, the compound is preferably brought into contact with a halogen-containing compound to be reacted therewith on the way to prepare the solid titanium catalyst component.

Among the above-mentioned various magnesium compounds, preferred are magnesium compounds not having reducing ability, and of these, magnesium chloride, alkoxymagnesium chloride and aryloxymagnesium chloride are particularly preferred.

In the preparation of the solid titanium catalyst component [A-1], it is preferred to use an electron donor (a).

Examples of the electron donors (a) include:

oxygen-containing electron donors such as alcohols, phenols, ketones, aldehydes, carboxylic acids, organic acid halides, esters of organic or inorganic acids, ethers, diethers, acid amides, acid anhydrides and alkoxysilane; and nitrogen-containing electron donors such as ammonias, amines, nitriles, pyridines and isocyanates.

In more concrete, there can be mentioned for example:

alcohols of 1–18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohol of 1–18 carbon atoms such as trichloromethanol, trichloroethanol and trichlorohexanol;

phenols of 6–20 carbon atoms which may have a lower alkyl group such as phenyl, cresol, xylenol, ethyl phenol, propyl phenol, nonyl phenol, cumyl phenol and naphthol;

ketones of 3–15 carbon atoms such as acetone, methyl ethyl ketone, methyl isobutyl ketone, acetophenone, benzophenone and benzoquinone;

aldehydes of 2–15 carbon atoms such as acetaldehyde, propionaldehyde, octylaldehyde, benzaldehyde, tolualdehyde and naphthaldedehyde;

organic acid esters of 2–18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, cumarine, phthalide and ethyl carbonate;

acid halides of 2–15 carbon atoms such as acetyl chloride, benzoyl chloride, toluic acid chloride and anisic acid chloride;

ethers of 2–20 carbon atoms such as methyl ether, ethyl ether, isopropyl ether, butyl ether, amyl ether, tetrahydrofuran, anisole and diphenyl ether;

acid amides such as N,N-dimethylacetamide, N,N-dimethybenzamide and N,N-dimethyltoluamide;

amines such as trimethylamine, triethylamine, tributylamine, tribenzylamine and tetramethylethylenediamine;

nitriles such as acetonitrile, benzonitrile and trinitrile;

pyridines such as pyridine, methyl pyridine, ethyl pyridine and dimethyl pyridine; and acid anhydrides such as acetic anhydride, phthalic anhydride and benzoic anhydride.

Preferred examples of the organic acid esters are polycarboxylates having skeleton of the following formula

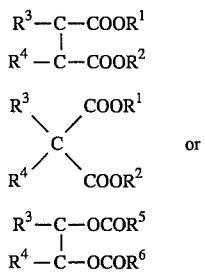

In the above formulas, $R^1$ is a substituted or unsubstituted hydrocarbon group; each of $R^2$, $R^5$ and $R^6$ is hydrogen or a substituted or unsubstituted hydrocarbon group; and each of $R^3$ and $R^4$ is hydrogen or a substituted or unsubstituted hydrocarbon group, preferably at least one of them being a substituted or unsubstituted hydrocarbon group. $R^3$ and $R^4$ may be bonded to each other to form a cyclic structure. When the hydrocarbon groups $R^1$ to $R^6$ are substituted, the substituted groups contain different atoms such as N, O and S, and have groups such as C-O-C, COOR, COOH, OH, $SO_3H$, —C-N-C— and $NH_2$.

Concrete examples of the polycarboxylates include:

aliphatic polycarboxylates, alicyclic polycarboxylates, aromatic polycarboxylates, and heterocyclic polycarboxylates.

Preferred examples of the polycarboxylates are n-butyl maleate, diisobutyl methylmaleate, di-n-hexyl cyclohexenecarboxylate, diethyl nadiate, diisopropyl tetrahydrophthalate, diethyl phthalate, diisobutyl phthalate, di-n-butyl phthalate, di-2-·ethylhexyl phthalate and dibutyl 3,4-furandicarboxylate.

Particularly preferred examples of the polycarboxylates are phthalates.

As the diether compounds, there can be mentioned compounds represented by the following formula:

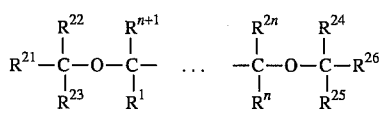

wherein n is an integer satisfying the condition of $2 \leq n \leq 10$; $R^1$ to $R^{26}$ are substituent groups having at least one element selected from carbon, hydrogen, oxygen, halogen, nitrogen, sulfur, phosphorus, boron and silicon; any optional combination of from $R^1$ to $R^{26}$, preferably $R^1$ to $R^{2n}$, may form in corporation a ring other than a benzene ring; and an atom other than a carbon atom may be contained in the main chain.

Preferred examples thereof are: 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis (cyclohexylmethyl)-1,3-dimethoxypropane.

The above-mentioned electron donors may be used in combination of two or more kinds.

In the preparation of the solid titanium catalyst component [A-1] employable in the invention, the above-mentioned various compounds may be brought into contact with organic or inorganic compounds containing silicon, phosphorus, aluminum, etc. which are conventionally used as carrier compounds and reaction assistants.

Useful carrier compounds are $Al_2O_3$, $SiO_2$, $B_2O_3$, MgO, CaO, $TiO_2$, ZnO, $SnO_2$, BaO, ThO and a resin such as a styrene/divinylbenzene copolymer. Of these, preferred are $Al_2O_3$, $SiO_2$ and a styrene/divinylbenzene copolymer.

The solid titanium catalyst component [A-1] employable in the invention is prepared by bringing the aforementioned titanium compound and magnesium compound (and preferably further the above-mentioned electron donor (a)) into contact with each other.

There is no specific limitation on a process for preparing the solid titanium catalyst component [A-1] using those compounds. Examples of the processes using a tetravalent titanium compound are briefly described below.

(1) A process comprising bringing a solution consisting of a magnesium compound, an electron donor (a) and a hydrocarbon solvent into contact with an organometallic compound, after or simultaneously with precipitating a solid by bringing the solution into contact with a titanium compound.

(2) A process comprising bringing a complex composed of a magnesium compound and an electron donor (a) into contact with an organometallic compound, and then bringing the reaction product into contact with a titanium compound.

(3) A process comprising bringing a product obtained by the contact of an inorganic carrier and an organic magnesium compound into contact with a titanium compound. In this case, the above product may be beforehand brought into contact with a halogen-containing compound, an electron donor (a) and/or an organometallic compound.

(4) A process comprising obtaining an inorganic or organic carrier on which a magnesium compound is supported from a mixture of an inorganic or organic carrier and a solution containing a magnesium compound and an electron donor (a) (and further a hydrogen solvent in some cases), and then bringing the obtained carrier into contact with a titanium compound.

(5) A process comprising bringing a solution containing a magnesium compound, a titanium compound and an electron donor (a) (and further a hydrogen solvent in some cases) into contact with an inorganic or organic carrier to obtain a solid titanium catalyst component [A-1] on which magnesium and titanium are supported.

(6) A process comprising bringing a liquid organic magnesium compound into contact with a halogen-containing titanium compound.

(7) A process comprising bringing a liquid organic magnesium compound into contact with a halogen-containing compound, and then bringing the product thus obtained into contact with a titanium compound.

(8) A process comprising bringing an alkoxy group-containing magnesium compound into contact with a halogen-containing titanium compound.

(9) A process comprising bringing a complex composed of an alkoxy group-containing magnesium compound and an electron donor (a) into contact with a titanium compound.

(10) A process comprising bringing a complex composed of an alkoxy group-containing magnesium compound and an electron donor (a) into contact with an organometallic compound, and then bringing the product thus obtained into contact with a titanium compound.

(11) A process comprising bringing a magnesium compound, an electron donor (a) and a titanium compound into contact with each other in an optional order. In this reaction, each components may be pretreated with an electron donor (a) and/or a reaction assistant such as an organometallic compound or a halogen-containing silicon compound.

(12) A process comprising bringing a liquid magnesium compound not having reducing ability into contact with a liquid titanium compound, if necessary in the presence of an electron donor (a), to precipitate a solid magnesium/titanium double compound.

(13) A process comprising further bringing the reaction product obtained in the above process (12) into contact with an titanium compound.

(14) A process comprising further bringing the reaction product obtained in the above process (11) or (12) into contact with an electron donor (a) and a titanium compound.

(15) A process comprising pulverizing a magnesium compound and a titanium compound (and if necessary an electron donor (a)) to obtain a solid product, and treating the solid product with either halogen, a halogen compound or aromatic hydrocarbon. This process may include a step of pulverizing only a magnesium compound, a step of pulverizing a complex compound composed of a magnesium compound and an electron donor (a), or a step of pulverizing a magnesium compound and a titanium compound. Further, after the pulverization, the solid product may be subjected to a pretreatment with a reaction assistant and then subjected to a treatment with halogen or the like. Examples of the reaction assistants include an organometallic compound and a halogen-containing silicon compound.

(16) A process comprising pulverizing a magnesium compound, and then bringing the pulverized magnesium compound into contact with a titanium compound. In this case, an electron donor (a) or a reaction assistant may be used in the pulverization stage and/or the contacting stage.

(17) A process comprising treating the compound obtained in any of the above processes (11) to (16) with halogen, a halogen compound or aromatic hydrocarbon.

(18) A process comprising bringing the reaction product obtained by the contact of a metal oxide, an organic magnesium compound and a halogen-containing compound into contact with a titanium compound and if necessary an electron donor (a).

(19) A process comprising bringing a magnesium compound such as a magnesium salt of organic acid, alkoxymagnesium or aryloxymagnesium into contact with a titanium compound and/or halogen-containing hydrocarbon and if necessary an electron donor (a).

(20) A process comprising bringing a hydrocarbon solution containing at least a magnesium compound and alkoxytitanium into contact with a titanium compound and/or an electron donor (a). In this case, a halogen-containing compound such as a halogen-containing silicon compound may be further brought into contact therewith, if necessary.

(21) A process comprising bringing a liquid magnesium compound not having reducing ability into contact with an organometallic compound so as to precipitate a solid magnesium/metal (aluminum) double compound, and then bringing the solid double compound into contact with a titanium compound and if necessary an electron donor (a).

Preparation of the solid titanium catalyst component [A-1] is generally carried out at a temperature of −70° to 200° C., preferably −50° to 150° C.

The solid titanium catalyst component [A-1] thus obtained contains titanium, magnesium and halogen, and preferably further contains an electron donor (a) in addition thereto.

In the solid titanium catalyst component [A-1], a ratio of halogen/titanium (atomic ratio) is 2–200, preferably 4–90, and a ratio of magnesium/titanium (atomic ratio) is 1–100, preferably 2–50.

The electron donor (a) is contained generally in the electron donor (a) /titanium ratio (molar ratio) of 0.01 to 100, preferably 0.05 to 50.

As for the solid titanium catalyst component [A-1], examples using a titanium compound are described in the invention, but the titanium used in the above compounds can be replaced with zirconium, hafnium, vanadium, niobium, tantalum or chromium.

In the invention, a titanium trichloride catalyst component [A-2] which is conventionally known can be also employed as other example of the solid titanium catalyst component exemplified as the transition metal compound catalyst component [A].

Processes for preparing the titanium trichloride catalyst component [A-2] are described in detail, for example, in Japanese Patent Laid-open Publications No. 63(1988)-17274, No. 64(1989)-38409, No. 56(1981)-34711, No. 61(1986)-287904, No. 63(1988)-75007, No. 63(1988)-83106, No. 59(1984)-13630, No. 63(1988)-108008, No. 63(1988)-27508, No. 57(1982)-70110, No. 58(1983)-219207, No. 1(1989)-144405 and No. 1(1989)-292011.

An example of the titanium trichloride catalyst component [A-2] is the aforementioned titanium trichloride. The titanium trichloride can be used together with the aforementioned electron donor (a) and/or tetravalent titanium compound, or can be used after those components are brought into contact with each other.

Further, a metallocene compound [A-3] can be also employed as the transition metal compound catalyst component [A].

Processes for preparing the metallocene compound [A-3] are described in detail, for example, in Japanese Patent Laid-open Publications No. 63(1988)-61010, No. 63(1988)-152608, No. 63(1988)-264606, No. 63(1988)-280703, No. 64(1989)-6003, No. 1(1989)-95110, No. 3(1991)-62806, No. 1(1989)-259004, No. 64(1989)-45406, No. 60(1985)-106808, No. 60(1985)-137911, No. 58(1983)-19309, No. 60(1985)-35006, No. 60(1985)-35007, No. 61(1986)-296008, No. 63(1988)-501369, No. 61(1986)-221207, No. 62(1987)-121707, No. 61(1986)-66206, No. 2(1990)-22307, No. 2(1990)-173110, No. 2(1990)-302410, No. 1(1989)-129003, No. 1(1989)-210404, No. 3(1991)-66710, No. 3(1991)-70710, No. 1(1989)-207248, No. 63(1988)-222177, No. 63(1988)-222178, No. 63(1988)-222179, No. 1(1989)-12407, No. 1(1989)-301704, No. 1(1989)-319489, No. 3(1991)-74412, No. 61(1986)-264010, No. 1(1989)-275609, No. 63(1988)-251405, No. 64(1989)-74202, No. 2(1990)-41303, No. 2(1990)-131488, No. 3(1991)-56508, No. 3(1991)-70708 and No. 3(1991)-70709.

The metallocene compound [A-3] is a compound concretely represented by the formula $$ML_x$$

wherein M is a transition metal selected from the group consisting of Zr, Ti, Hf, V, Nb, Ta and Cr, L is a ligand coordinating to the transition metal, at least one of L is a ligand having a cyclopentadienyl skeleton, L other than the ligand having a cyclopentadienyl skeleton is a hydrocarbon group of 1–12 carbon atoms, an alkoxy group, an aryloxy group, trialkylsilyl group, $SO_3R$ (wherein R is a hydrocarbon group of 1 to 8 carbon atoms which may have a substituent such as halogen), halogen atom or hydrogen atom, and x is a valence of the transition metal.

The ligands having a cyclopentadienyl skeleton include, for example, cyclopentadienyl, alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, and hexylcyclopentadienyl, and an indenyl group, 4,5,6,7-tetrahydroindenyl group and a fluorenyl group. These groups may be substituted by a halogen atom or trialkylsilyl group.

Of these ligands coordinating to the transition metal, the alkyl-substituted cyclopentadienyl groups are most preferred.

When the compound represented by the above formula contains two or more ligands having a cyclopentadienyl skeleton, two ligands having a cyclopentadienyl skeleton may be bonded together via an alkylene group such as ethylene and propylene, a substituted alkylene group such as isopropylidene and diphenylmethylene, a silylene group or a substituted silylene group such as dimethylsilylene, diphenylsilylene and methylphenylsilylene.

The following ligands may be exemplified as the ligand other than those having a cyclopentadienyl skeleton.

The hydrocarbon group having 1–12 carbon atoms includes, for example, alkyl, cycloalkyl, aryl and aralkyl;

the alkyl group includes methyl, ethyl, propyl, isopropyl and butyl;

the cycloalkyl group includes, for example, cyclopentyl and cyclohexyl;

the aryl group includes, for example, phenyl and tolyl; and the aralkyl group includes, for example, benzyl and neophyl.

The atkoxy group includes, for example, methoxy, ethoxy and butoxy;

the aryloxy group includes, for example, phenoxy; and the hologen includes, for example, fluorine, chlorine, bromine and iodine.

The ligand represented by SO$_3$R includes, for example, p-toluenesulfonate, methanesulfonate and trifluoromethanesulfonate.

When the transition metal has a valence of 4, the metallocene compound [A-3] containing ligands having a cyclopentadienyl skeleton may be represented more concretely by the formula

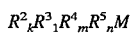

$$R^2{}_kR^3{}_lR^4{}_mR^5{}_nM$$

wherein M is an above mentioned transition metal, R$^2$ is a group (ligand) having a cyclopentadienyl skeleton, R$^3$, R$^4$ and R$^5$ are each a group having a cyclopentadienyl skeleton, an alkyl group, cycloalkyl group, aryl group, aralkyl group, alkoxy group, aryloxy group, trialkylsilyl group, SO$_3$R group, halogen atom or hydrogen atom, k is an integer of at least 1, and k+l+m+n=4.

In the transition metal compounds of the above-mentioned formula R$^2{}_k$R$^3{}_l$R$^4{}_m$R$^5{}_n$M, at least two of R$^2$, R$^3$, R$^4$ and R$^5$ preferablly have a cyclopentadienyl skeleton, that is, R$^2$ and R$^3$ are each a group having a cyclopentadienyl skeleton. These groups having a cyclopentadienyl skeleton may be bonded to each other via an alkylene group such as ethylene and propylene, a substituted alkylene group such as isopropylidene, diphenylmethylene, a silylene group or a substituted silylene group such as dimethylsilylene, diphenylsilylene and methylphenylsilylene. Also, R$^4$ and R$^5$ may be each a group having a cyclopentadienyl skeleton, an alkyl group, cycloalkyl group, aryl group, aralkyl group, alkoxy group, aryloxy group, trialkylsilyl group, SO$_3$R, halogen atom or hydrogen atom.

Listed below are typical representatives of the transition metal compounds in which M is zirconium.

Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethyl zirconium,
Ethylenebis(indenyl)diphenyl zirconium,
Ethylenebis(indenyl)methyl zirconium monochloride,
Ethylenebis(indenyl)zirconium bis(mehtanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene (cyclopentadienyl-methylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconium bis(trifluoromethanesulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(cyclopentadienyl)zirconium monochloride monohydride,
Bis(cyclopentadienyl)methyl zirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxy chloride,
Bis(cyclopentadienyl)zirconium ethoxy chloride,
Bis(cyclopentadienyl)zirconium bis(mehtanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxy chloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis-(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride,
Bis(trimethylsilylcyclopentadienyl)zirconium dichloride In the above-mentioned metallocene compound, the di-substituted cyclopentadienyl groups include 1,2- and 1,3- substituted groups, and the tri-substituted cyclopentadienyl groups include 1,2,3- and 1,2,4- substituted groups. Also the alkyl groups such as propyl and butyl include n-, i-, sec- and tert- isomers.

There may also be used transition metal compounds wherein the zirconium metal in the above-exemplified zirconium compounds is replaced with titanium, hafnium, vanadium, niobium, tantalum or chromium.

These compounds may be used alone or in combination of two or more.

Further, those compounds may be used after diluted in hydrocarbon or halogenated hydrocarbon.

In the invention, a zirconocene compound having zirconium as its central metal atom and having a ligand containing at least two cyclopentadienyl skeletons is preferably used as the metallocene compound [A-3].

Such metallocene compound as mentioned above can be supported on a carrier by bringing it into contact with a particulate carrier compound.

Examples of the carrier compounds employable in the invention include organic carrier compounds such as $SiO_2$, $Al_2O_3$, $B_2O_3$, MgO, $ZrO_2$, CaO, $TiO_2$, ZnO, $SnO_2$, BaO and ThO; and resins such as polyethylene, polypropylene, poly-1-butene, poly-4-methyl-1-pentene and a styrene/divinyl-benzene copolymer.

These carrier compounds may be used in combination of two or more kinds.

Among the above-mentioned compounds, preferably used are $SiO_2$, $Al_2O_3$ and MgO.

Next, the organometallic compound catalyst component [B] containing a metal selected from metals in Group I to Group III of a periodic table employable for forming the prepolymerized catalyst [I] of the invention will be described.

As the organometallic compound catalyst component [B], there can be employed for example an organoaluminum compound [B-I], an alkyl complex compound composed of a metal in Group I of a periodic table and aluminum, an organometallic compound of a metal in Group II of a periodic table.

The organoaluminum compound [B-1] is, for example, the organoaluminum compound represented by the formula:

$$R^a{}_nAlX_{3-n}$$

wherein $R^a$ is hydrocarbon of 1–12 carbon atoms, X is halogen or hydrogen, and n is 1–3.

In the above-mentioned formula, $R^a$ is hydrocarbon group of 1–12 carbon atoms, such as, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds [B-1], there may also be used a compound represented by the following formula:

$$R^a{}_nAlY_{3-n}$$

wherein $R^a$ is as defined above, Y is $-OR^b$, $-OSiR^c{}_3$, $-OAlR^d{}_2$, $-NR^e{}_2$, $-SiR^f{}_3$, or $-N(R^g)AlR^h{}_2$, n is 1–2 and $R^b$, $R^c$, $R^d$ and $R^h$ are each methyl, ethyl, isopropyl, isobutyl, cyclohexyl, phenyl, etc;

$R^e$ is hydrogen, methyl, ethyl, isopropyl, phenyl, trimethylsilyl, etc; and $R^f$ and Rg are each methyl, ethyl, etc.

The organoaluminum compounds [B-1] include, in concrete, such compounds as mentioned below.

(i) Compounds of the formula $R^a{}_nAl(OR^b)_{3-n}$ such as dimethylaluminum methoxide, diethylaluminum ethoxide, diisobutylaluminum methoxide, etc;

(ii) Compounds of the formula $R^a{}_nAl(OSiR^c{}_3)_{3-n}$ such as $Et_2Al(OSiMe_3)$, (iso-$Bu)_2Al(OSiMe_3)$, (iso-Bu)$_2Al(OSiEt_3)$, etc;

(iii) Compounds of the formula $R^a{}_nAl(OAlR^d{}_2)_{3-n}$ such as $Et_2AlOAlEt_2$, (iso-Bu)$_2AlOAl$(iso-Bu)$_2$, etc;

(iv) Compounds of the formula $R^a{}_nAl(NR^e{}_2)_{3-n}$ such as $Me_2AlNEt_2$, $Et_2AlNHMe$, $Me_2AlNHEt$; $Et_2AlN(Me_3Si)_2$, (iso-Bu)$_2AlN(Me_3Si)_2$, etc;

(v) Compounds of the formula $R^a{}_nAl(SiR^f{}_3)_{3-n}$ such as (iso-Bu)$_2AlSiMe_3$, etc; and (vi) Compounds of the formula $R^a{}_nAl[N(R^g)-AlR^h{}_2]_{3-n}$ such as $Et_2AlN(Me)-AlEt_2$, (iso-Bu)$_2AlN(Et)Al$(iso-Bu)$_2$, etc.

Of the organoaluminum compounds [B-1] as exemplified above, preferred are those of the formula $R^a{}_3Al$, $R^a{}_nAl(OR^b)_{3-n}$ n or $R^a{}_nAl(OAlR^d{}_2)_{3-n}$.

The alkyl complex compound composed of a metal in Group I of a periodic table and aluminum can be exemplified by a compound represented by the following formula:

$$M^1AlR^j{}_4$$

wherein $M^1$ is Li, Na or K, and $R^j$ is a hydrocarbon group of 1–15 carbon atoms.

Concrete examples of the alkyl complex compounds include $LiAl(C_2H_5)_4$ and $LiAl(C_7H_{15})_4$.

The organometallic compound of a metal in Group II of a periodic table can be exemplified by a compound represented by the following formula:

$$R_1R_2M_2$$

wherein each of $R_1$ and $R_2$ is a hydrocarbon group of 1–15 carbon atoms or a halogen, $R_1$ and $R_2$ may be the same or different from each other but excluding a case where both of them are halogens, and $M_2$ is Mg, Zn or Cd.

Concrete examples thereof include diethylzinc, diethylmagnesium, butylethylmagnesium, ethylmagnesium chloride and butylmagnesium chloride.

These compounds may be employed in combination of two or more kinds.

Concrete examples of the organoaluminum oxy-compound [B-2] are aluminoxanes represented by the following formula (1) or (2).

$$R_2Al-(OAl)_m-OAlR_2 \atop |\phantom{xx}R} \tag{1}$$

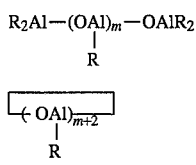  (2)

In the formulas (1) and (2), R is a hydrocarbon group such as a methyl group, an ethyl group, a propyl group or a butyl group, preferably a methyl group, an ethyl group, more preferably a methyl group; and m is an integer of 2 or more, preferably an integer of from 5 to 40.

The aluminoxane used herein may be formed from mixed alkyloxyaluminum units composed of an alkyloxyaluminum unit represented by the formula $(OAl(R^1))$ and an alkyloxyaluminum unit represented by the formula $(OAL(R^2))$, wherein each of $R^1$ and $R^2$ is exemplified by the similar hydrocarbons to those for the above R, and $R^1$ and $R^2$ are groups different from each other. In this case, preferred is aluminoxane formed from the mixed alkyloxyalumium units containing a methyloxyaluminum unit $(OAl(CH_3))$ generally in an amount of not less than 30% by mol, preferably not less than 50% by mol, particularly preferably not less than 70% by mol.

The organoaluminum oxy- compound [B-2] used in the invention may be aluminoxane hitherto known or such benzene-insoluble organoaluminum oxy compounds having been discovered by the present applicants.

The aluminoxane may be prepared, for example, by the following methods.

(1) A method wherein suspensions of compounds containing adsorbed water or salts containing water of crystallization, for example, magnesiumchloride hydrate, copper sulfate hydrate, aluminum sulfate hydrate, nickel sulfate hydrate and ceriun (I) chloride hydrate, in hydrocarbon solvents are allowed to react with an organoaluminum compound such as trialkylaluminum, and the desired aluminoxane is recovered as a hydrocarbon solution containing the same.

(2) A method wherein an organoaluminum compound such as trialkylaluminum is treated directly with water, ice or water vapor in such solvent as benzene, toluene, ethyl ether or tetrahydrofuran, and the desired aluminoxane is recovered as a hydrocarbon solution containing the same.

(3) A method wherein an organoaluminum compound such as trialkylaluminum is allowed to react with an organotin oxide in a solvent such as decane, benzene or toluene.

Of these, preferred is the method of (1). The aluminoxane as illustrated above may contain small amounts of organometallic components other than aluminum. From the above-mentioned solution containing aluminoxane as recovered, the solvent or unaltered organoaluminum compound is removed by distillation, and the remaining aluminoxane may be dissolved again in a solvent.

The organoaluminum compound used in preparing the aluminoxane includes concretely trialkylaluminum such as trimethylaluminum, triethylaluminum, tripropylalminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum atkoxide such as dimethylaluminum methoxide or diethylaluminum ethoxide; and dialkylaluminum aryloxide such as diethylaluminum phenoxide.

Furthermore, the isoprenylaluminum represented by the general formula below may also be used $$(i\text{-}C_4H_9)_xAl_y(C_5H_{10})_z$$

wherein x, y and z are each a positive number, and $z \geq 2x$.

Of these, trialkylaluminum is particularly preferred.

Solvents used in the solutions of aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; or halogenated hydrocarbons such as halides, particularly chloride and bromides, of the above-mentioned aromatic, aliphatic and alicyclic hydrocarbons. In addition thereto, there may also be used ethers other than ethyl ether and tetrahydrofuran. Of these solvents as exemplified above, particularly preferred are aromatic hydrocarbons.

When the aforementioned transition metal compound catalyst component [A] is a solid titanium catalyst component [A-1] or a titanium trichloride catalyst component [A-2], the organometallic compound catalyst component [B] is preferably an organoaluminum compound [B-1]. When the transition metal compound catalyst component [A] is a metallocene compound [A-3], the organometallic compound catalyst component [B] is preferably an organoaluminum oxy-compound [B-2].

In the prepolymerization of an α-olefin and a polyene compound to a catalyst comprising the transition metal compound catalyst component [A] and the organometallic compound catalyst component [B], the aforementioned electron donor (a) or an electron donor (b) described-below may be employed, if necessary.

Useful electron donor (b) is an organosilicon compound represented by the following formula:

$$R_nSi(OR')_{4-n}$$

wherein each of R and R' is a hydrocarbon group, and n is a number satisfying the condition of 0<n<4.

Concrete examples of the organosilicon compounds represented by the above formula include:

trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilne, n-butyltriethoxysilane, isobutyltriethoxysilane, phenyltriethoxysilane, γ-aminopropyltriethoxysilane, chlorotriethoxysilane, ethyltrisipropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyoxysilane, vinyltris(β-methoxyethoxysilane), vinyltriacetoxysilane, dimethltetraethoxysilane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis(2-methylcyclopentyl)dimethoxysilane, bis(2,3-dimethylcyclopentyl)dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane, and cyclopentyldimethylethoxysilane.

Of these, preferably used are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

The above-mentioned organosilicon compounds may be used in combination of two or more kinds.

Further, also employable as the electron donor (b) in the invention are:

2,6-substituted piperidines, 2,5-substituted piperidines;

substituted methylenediamines such as N,N,N'N'-tetramethylenediamine and N,N,N'N'-tetraethylmethylenediamines;

nitrogen-containing electron donors such as substituted methylenediamines (e.g., 1,3-dibenzylimidazolidine and 1,3-dibenzyl-2-phenylimidazolidine);

phosphorus-containing electron donors such as phosphites (e.g., triethyl phosphite, tri-n-propyl phosphite, triisopropyl phosphite, tri-n-butyl phosphite, triisobutyl phosphite, diethyl-n-butyl phosphite and diethylphenyl phosphite); and oxygen-containing electron donors such as 2,6-substituted tetrahydropyrans and 2,5-substituted tetrahydropyrans.

The above-mentioned electron donors (b) may be used in combination of two or more kinds.

The prepolymerized catalyst [I] according to the invention can be obtained by copolymerizing an α-olefin and a polyene compound to a catalyst comprising the transition metal compound catalyst component [A] and the organometallic compound catalyst component [B].

The α-olefins employable in the invention are α-olefins of 2–20 carbon atoms. Concrete examples of such α-olefins include ethylene, propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene.

They can be used singly or in combination.

The α-olefin used in the prepolymerization may be the same as or different from an α-olefin which is used in the polymerization described later.

Among the above-exemplified α-olefins, preferably used are ethylene, propylene, 1-butene, 4-methyl-1-pentene, 3-methyl-1-butene and 1-eicosene.

Concrete examples of the polyene compounds include:

aliphatic polyene compounds such as 4-methyl-1,4-hexadiene, 5-methyl-1, 4-hexadiene, 6-methyl-1,6-octadiene, 7-methyl-1,6-octadiene, 6-ethyl-1, 6-octadiene, 6-propyl-1,6-octadiene, 6-butyl-1,6-octadiene, 7-methyl-1,6-nonadiene, 6-ethyl-1,6-notadiene, 7-ethyl-1,6-nonadiene, 6-methyl-1,6-decadiene, 7-methyl-1,6-decadiene, 6-methyl-1,6-undecadiene;

1,4-hexadiene, 1,5-hexadiene, 1,6-heptadiene, 1,6- octadiene, 1,7-octadiene, 1,8-nonadiene, 1,9-decadiene, 1,1,3-tetradecadiene, 1,5,9-decatriene butadiene and isoprene;

vinylcyclohexene, vinylnorbornene, ethylidenenorbornene, dicyclopentadiene, cyclooctadiene, 2,5-norbornadiene;

alicyclic polyene compounds such as 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane and 1-isopropenyl-3-vinylcyclopentane; and aromatic polyene compounds such as divinylbenzene and vinylisopropenylbenzene.

They are used singly or in combination in the copolymerization with the α-olefin.

Among the above-mentioned polyene compounds, preferably used in the invention are polyene compounds having 7 or more carbon atoms and having an olefinic double bond at the both terminals, and more preferably used are aliphatic or alicyclic polyene compounds having an olefinic double bond at the both terminals.

Concrete examples of such preferable polyene compounds include 1,6-heptadiene, 1,7-octadiene, 1,9-decadiene, 1,13-tetradecadiene, 1,5,9-decatriene, 1,4-divinylcyclohexane, 1,3-divinylcyclopentane, 1,5-divinylcyclooctane, 1-allyl-4-vinylcyclohexane and 1,4-diallylcyclohexane.

Of these, preferred are aliphatic polyene compounds having 7 or more carbon atoms, preferably having 8 or more carbon atoms, more preferably 10 or more carbon atoms, and particularly preferred are straight-chain aliphatic polyene compounds having 7 or more carbon atoms.

In the copolymerization of the above-mentioned α-olefin and polyene compound, combinations preferably used in the invention are:

ethylene/1,7-octadiene, ethylene/1,9-decadiene, ethylene/1,13-tetradecadiene, ethylene/1,5,9-decatriene, propylene/1,7-octadiene, propylene/1,9-decadiene, propylene/1,13-tetradecadiene, propylene/1,5,9-decatriene, butene/1,9-decadiene, butene/1,5,9-decatriene, 4-methyl-1-pentene/1,9-decadiene, 3-methyl-1-butene/1,9-decadiene, 1-eicosene/1,9-decadiene, propylene/1,4-divinylcyclohexane, and butene/1,4-divinylcyclohexane.

In the present invention, the α-olefin/polyene copolymer (i) is preferably a high-molecular-weight copolymer. The melt flow rate of the α-olefin/polyene copolymer (i) is preferably 0.1 dg/min or less, more preferably 0.01 dg/min or less.

When the α-olefin and the polyene compound are prepolymerized to the aforementioned transition metal compound catalyst component [A] and the organometallic compound catalyst component [B] in the invention, the polyene compound is used generally in an amount of 0.0001 to 10 mol, preferably 0.0005 to 5 mol, especially preferably 0.001 to 2 mol per 1 mol of the α-olefin.

In the invention, the prepolymerization can be carried out in the presence of an inert solvent which will be described later. In the prepolymerization, the above-mentioned monomers and catalyst components are added to the inert solvent, and the prepolymerization is preferably conducted under relatively mild conditions. The prepolymerization may be carried out under such condition that the produced prepolymer would be either dissolved in the polymerization medium or not dissolved therein, but preferably carried out under such condition that the produced prepolymer is not dissolved in the polymerization medium.

In more concrete, the prepolymerized catalyst [I] can be prepared in the invention by the following processes.

i) A process comprising bringing the transition metal compound catalyst component [A] and the organometallic compound catalyst component [B] and if necessary the electron donor into contact with each other in an inert solvent to form a catalyst, and copolymerizing the α-olefin and the polyene compound to the obtained catalyst to form a prepolymerized catalyst.

ii) A process comprising bringing the transition metal compound catalyst component [A] and the organometallic compound catalyst component [B] and if necessary the electron donor into contact with each other in a mixture of the α-olefin and the polyene compound to form a catalyst, and copolymerizing the α-olefin and the polyene compound to the obtained catalyst to form a prepolymerized catalyst.

Concrete examples of the above-mentioned inert solvents include:

aliphatic hydrocarbons such as propane, butane, pentane, hexane, heptane, octane, decane, dodecane and kerosine;

alicyclic hydrocarbons such as cyclopentane, cyclohexane and methylcyclopentane;

aromatic hydrocarbons such as benzene, toluene and xylene;

halogenated hydrocarbons such as α-olefin chloride and chlorobenzene; and mixtures of these hydrocarbons.

Of these, preferably used are aliphatic hydrocarbons.

The prepolymerization can be carried out by any process of a batch process, a semi-continuous process and a continuous process.

In the prepolymerization, a catalyst having a higher concentration than that of a catalyst used in the polymerization can be employed.

The concentrations of the catalyst components in the prepolymerization vary depending on the catalyst components used. The transition metal compound catalyst component is used in an amount (per 1 liter of the polymerization volume) of generally about 0.001 to 5,000 mmol, preferably about 0.01 to 1,000 mmol, more preferably 0.1 to 500 mmol, in terms of the transition metal atom.

The organometallic compound catalyst component is used in such an amount that a precopolymer would be produced in an amount of 0.01 to 2,000 g, preferably 0.03 to 1,000 g, more preferably 0.05 to 200 g, per 1 g of the transition metal compound catalyst component, that is, the organometallic compound catalyst component is used in an amount of generally about 0.1 to 1,000 mol, preferably about 0.5 to 500 mol, more preferably 1 to 100 mol, per 1 mol of the transition metal atom contained in the transition metal compound catalyst component.

In the case of using an electron donor in the prepolymerization, the amount of the electron donor is in the range of 0.01 to 50 mol, preferably 0.05 to 30 mol, more preferably 0.1 to 10 mol, per 1 mol of the transition metal atom contained in the transition metal compound catalyst component.

The reaction temperature in the prepolymerization is desired to be in the range of usually about −20° to +100° C., preferably about −20° to +80° C., more preferably −10° to +40° C.

A molecular weight regulator such as hydrogen can be used in the prepolymerization.

The prepolymerized catalyst [I] of the present invention can be obtained by copolymerizing the above-mentioned α-olefin and polyene compound to the transition metal compound catalyst component [A] and the organometallic compound catalyst component [B], in the total amounts of the α-olefin and the polyene compound of 0.01 to 2,000 g, preferably 0.03 to 1,000 g, more preferably 0.05 to 200 g, per 1 g of the transition metal compound catalyst component.

The prepolymerized catalyst [I] obtained as above contains an α-olefin/polyene copolymer, and the α-olefin/polyene copolymer is desired to contain constituent units derived from the α-olefin in an amount of 99.999 to 50% by mol, preferably 99.999 to 70% by mol, more preferably 99.995 to 75% by mol, much more preferably 99.99 to 80% by mol, most preferably 99.95 to 85% by mol, and to contain constituent units derived from the polyene compound in an amount of 0.001 to 50% by mol, preferably 0.001 to 30% by mol, more preferably 0.005 to 25% by mol, much more preferably 0.01 to 20% by mol, most preferably 0.05 to 15% by mol.

The composition ratio in the above-mentioned α-olefin/polyene copolymer can be determined by measuring the amounts of the α-olefin and the polyene compound consumed in the prepolymerization reaction. Concretely, the constituent units [P] (% by mol) can be calculated as follows.

$$[P] \text{ (\% by mol)} = \frac{([P_0] - [P_r]) \times 100}{([P_0] - [P_r]) + ([\alpha_0] - [\alpha_r])}$$

In the above formula, each symbol has the following meaning.

$[P_o]$: number of moles of the polyene compound fed in the prepolymerization $[P_r]$: number of moles of the unreacted polyene compound $[\alpha_o]$: number of moles of the α-olefin fed in the prepolymerization $[\alpha_r]$: number of the unreacted α-olefin $[\alpha_r]$ and $[P_r]$ in the above formula can be determined by measuring the unreacted α-olefin and the unreacted polyene compound both remaining in the polymerizer by means of gas chromatography, etc.

The prepolymerized catalyst obtained as above is generally in the form of a suspension.

The prepolymerized catalyst in the form of a suspension can be per se used in the subsequent polymerization, or a prepolymerized catalyst obtained by separating from the suspension can be also used in the subsequent polymerization.

When the prepolymerized catalyst in the form of a suspension per se is used in the subsequent polymerization, the prepolymerized catalyst may be used singly without combining the organometallic catalyst component [II] and the electron donor [III].

In the invention, prior to the prepolymerization, olefin may be beforehand prepolymerized to the transition metal compound catalyst component [A] and the organometallic compound catalyst component [B].

As the olefin, α-olefin (preferably propylene) is employed.

If the olefin is beforehand prepolymerized to the catalyst components [A] and [B], there can be obtained for example the following effect. That is, when the olefin is beforehand prepolymerized to the catalyst components [A] and [B], a prepolymerized catalyst excellent in particle properties such as particle diameter distribution and particle size distribution can be obtained.

When the olefin is polymerized or copolymerized using such prepolymerized catalyst [I] as mentioned above, an olefin polymer having a high melt tension can be obtained.

The catalyst for olefin polymerization according to the invention is described below.

The catalyst for olefin polymerization according to the invention is formed from [I] the prepolymerized catalyst obtained as above and [II] an organometallic compound catalyst component containing a metal selected from metals in Group I to Group III of the periodic table. The catalyst for olefin polymerization may be formed from [I] the prepolymerized catalyst, [II] the organometallic compound catalyst component, and [III] an electron donor.

As the organometallic compound catalyst component [II] used herein, those similar to the aforementioned organometallic compound catalyst component [B] are employed.

As the electron donor [III] used herein, those similar to the aforementioned electron donor (a) or electron donor (b) are employed. These electron donors (a) and (b) may be used in combination.

The catalyst for olefin polymerization according to the invention may contain other components which are useful for olefin polymerization, in addition to the above-mentioned components.

In the polymerization process of olefin according to the invention, olefin is polymerized or copolymerized in the presence of such catalyst for olefin polymerization as mentioned above.

Examples of the olefins used herein are the aforementioned α-olefins of 2 to 20 carbon atoms.

Also employable are:

aromatic vinyl compounds such as styrene, substituted styrenes (e.g., dimethyl styrene), allylbenzene, substituted allylbenzenes (e.g., allyltoluene), vinylnaphthalene, substituted vinylnaphthalenes, allylnaphthalene and substituted allylnaphthalenes;

alicyclic vinyl compounds such as vinylcyclohexane, substituted vinylcyclohexane, vinylcyclopentane, substituted vinylcyclopentane, vinylcycloheptane, substituted vinylcycloheptane and allylnorbornane;

cyclic olefins such as cyclopentene, cycloheptene, norbornene, 5-methyl-2- norbornene, tetracyclododecene and 2-methyl-1,4,5,8-dimethano-1,2,3,4,4a,5,8,8a-octahydronaphthalene;

silane type unsaturated compounds such as allyltrimethylsilane, allyltriethylsilane, 4-trimethylsilyl-1-butene, 6-trimethylsilyl-1-hexene, 8-trimethylsilyl-1-octene and 10-trimethylsilyl-1-decene; and the aforementioned polyene compounds.

They can be employed singly or in combination.

Of these, preferably used are ethylene, propylene, 1-butene, 3-methyl-1-butene, 3-methyl-1-pentene, 4-methyl-1-pentene, vinylcyclohexane, dimethyl styrene, allyltrimethylsilane and altylnaphthalene.

In the invention, the polymerization can be carried out by either a process for liquid phase polymerization such as solution polymerization and suspension polymerization, or a process for gas phase polymerization.

When the polymerization reaction is carried out in a form of a slurry polymerization, the aforementioned inert organic solvents may be used as the reaction solvent, or olefins which are liquid at the reaction temperature may be used as the reaction solvent.

In the polymerization process according to the invention, the prepolymerized catalyst [I] is used in an amount (per 1 liter of the polymerization volume) of usually about 0.001 to 100 mmol, preferably about 0.005 to 20 mmol, in terms of the transition metal atom in the prepolymerized catalyst [I]. The organometallic compound catalyst component [II] is used in such an amount that the metal atoms contained in the catalyst component [II] would be usually about 1 to 2,000 mol, preferably about 2 to 500 mol, per 1 mol of the transition metal atom contained in the prepolymerized catalyst [I] in the polymerization system.

When the electron donor [III] is used, the amount of the electron donor [III] is generally in the range of about 0.001 to 10 mol, preferably 0.01 to 5 mol, per 1 mol of the metal atom of the organometallic compound catalyst component [II].

If hydrogen is used in the polymerization, the molecular weight of the resulting polymer can be regulated, and the obtained polymer has a high melt flow rate.

The conditions for the polymerization process of the invention depend on the olefins used, but generally the polymerization process is carried out under the following conditions.

The polymerization temperature is generally in the range of about 20° to 300° C., preferably about 50° to 150° C., and the polymerization pressure is generally in the range of a normal pressure to 100 kg/cm$^2$, preferably about 2 to 50 kg/cm$^2$.

In the process of the invention, the polymerization can be carried out either batchwise, semi-continuously or continuously. Further, the polymerization may be also carried out in two or more steps having reaction conditions different from each other.

A homopolymer of olefin may be prepared by the polymerization of the invention. Otherwise, a random copolymer or a block copolymer may be also prepared from two or more kinds of olefins by the polymerization of the invention.

When the polymerization process of olefin is practiced using the catalyst for olefin polymerization as described above, an olefin polymer having a high melt tension can be obtained with high polymerization activity.

The olefin polymer of the present invention is an α-olefin/polyene copolymer-containing olefin polymer comprising:

(i) an α-olefin/polyene copolymer, and
(ii) an olefin polymer.

In more detail, the olefin polymer of the invention is an olefin polymer being obtained by polymerizing or copolymerizing olefin in the presence of a catalyst for olefin polymerization, said catalyst comprising: [I] a prepolymerized catalyst being obtained by prepolymerizing an α-olefin and a polyene compound to:

[A] a transition metal compound catalyst component, and
[B] an organometallic compound catalyst component containing a metal selected from metals in Group I to Group III of a periodic table, in the total amounts of the α-olefin and the polyene compound of 0.01 to 2,000 g per 1 g of the transition metal compound catalyst component;

[II] an organometallic compound catalyst component containing a metal selected from metals in Group I to Group III of a periodic table; and preferably further [III] an electron donor;

said olefin polymer comprising (i) α-olefin/polyene copolymer formed by prepolymerization and (ii) an olefin polymer formed by polymerization.

The olefin polymer containing an α-olefin/polyene copolymer according to the invention contains the α-olefin/polyene copolymer (i) in an amount of 0.001 to 99% by weight, preferably 0.005 to 90% by weight, more preferably 0.01 to 88% by weight, and contains the olefin polymer (ii) in an amount of 99.999 to 1% by weight, preferably 99.995 to 10% by weight, were preferably 99.99 to 12% by weight.

Among such olefin polymers according to the invention, particularly preferred is an olefin polymer containing the α-olefin/polyene copolymer (i) in an amount of 0.001 to 15% by weight, especially 0.008 to 10% by weight and the otefin polymer (ii) in an amount of 99.999 to 85% by weight, especially 99.992 to 90% by weight.

The melt flow rate (MFR) of the olefin polymer according to the invention, as measured in accordance with ASTM D1238 (polypropylene: 230° C.; polyethylene: 190° C., 2.16 kg), is not more than 5000 g/10 min, preferably in the range of 0.01 to 3000 g/10 min, more preferably 0.02 to 2000 g/10 min, most preferably 0.05 to 1000 g/10 min.

Accordingly, the olefin polymer of the invention has a high melt tension (MT).

In the olefin polymer of the invention, the melt tension (MT) and the melt flow rate (MFR) satisfy the following relation.

For example, if the α-olefin/polyene copolymer (i) and the olefin polymer (ii) both constituting the olefin polymer of the invention are an ethylene/polyene copolymer and polypropylene, respectively, the melt tension and the melt flow rate in this olefin polymer satisfy the following relation:

generally, $\log [MT] \geq -0.8 \log [MFR]+0.3$; preferably, $\log [MT] \geq -0.8 \log [MFR]+0.5$; more preferably, $\log [MT] \geq -0.8 \log [[MFR]+0.7$; most preferably, $\log [MT] \geq -0.8 \log [MFR]+0.8$.

If the α-olefin/polyene copolymer (i) is a copolymer of α-olefin of 3 or more carbon atoms and polyene and the olefin polymer (ii) is polypropylene in the olefin polymer of the invention, the melt tension and the melt flow rate in this olefin polymer satisfy the following relation:

generally, $\log [MT] \geq -0.8 \log [MFR]+0.30$; preferably, $\log [MT] \geq -0.8 \log [MFR]+0.35$; more preferably, $\log [MT] \geq -0.8 \log [MFR]+0.40$.

By the way when a melt tension of the olefin polymer (ii) is represented as $[MT_0]$, a melt tension of the α-olefin/polyene copolymer-containing polymer is represented as $[MT]$ and a weight percentage of the α-olefin/polyene copolymer (i) in the α-olefin/polyene copolymer-containing polymer is represented as $[C]$, these $[MT_0]$, $[MT]$ and $[C]$ satisfy the following relation:

$$\frac{[MT]}{[MT_0]} \geq \frac{1}{20} \log[C] + 1.25$$

preferably $$\frac{[MT]}{[MT_0]} \geq \frac{1}{10} \log[C] + 1.50$$

more preferably $$\frac{[MT]}{[MT_0]} \geq \frac{3}{20} \log[C] + 1.75$$

most preferably $$\frac{[MT]}{[MT_0]} \geq \frac{1}{5} \log[C] + 2.00$$

Furthermore, when the olefin polymer of the invention is composed of an ethylene/polyene copolymer (i) and polyethylene (ii) as described above and has a density of about 0.92 g/cm$^3$ and MFR of 1 g/10 min, the melt tension of this olefin polymer is not less than 2.5 g, preferably not less than 3.5 g, more preferably not less than 4.0 g, much more preferably not less than 4.5 g, most preferably not less than 5.0 g.

An intrinsic viscosity [η] of the olefin polymer according to the invention, as measured in decalin at 135° C., is in the range of 0.05 to 20 dl/g, preferably 0.1 to 15 dl/g, more preferably 0.2 to 13 dl/g.

In the olefin polymer of the invention, the melt tension (MT) and an intrinsic viscosity [η] also satisfy the following relation.

For example, if the α-olefin/polyene copolymer (i) and the olefin polymer (ii) both constituting the olefin polymer of the invention are an ethylene/polyene copolymer and polypropylene, respectively, the melt tension and the intrinsic viscosity [η] in this olefin polymer satisfy the following relation:

generally, $\log [MT] \geq 3.7 \log [(\eta)] - 1.5$; preferably, $\log [MT] \geq 3.7 \log [(\eta)] - 1.3$; more preferably, $\log [MT] \geq 3.7 \log [(\eta)] - 1.1$; most preferably, $\log [MT] \geq 3.7 \log [(\eta)] - 1.0$.

If the α-olefin/polyene copolymer (i) is a copolymer of α-olefin of 3 or more carbon atoms and polyene and the olefin polymer (ii) is polypropylene in the olefin polymer of the invention, the melt tension and the intrinsic viscosity in this olefin polymer satisfy the following relation:

generally, $\log[MT] \geq 3.7 \log [(\eta)] - 1.50$; preferably, $\log [MT] \geq 3.7 \log [(\eta)] - 1.45$; more preferably, $\log [MT] \geq 3.7 \log [(\eta)] - 1.40$.

Furthermore, when the olefin polymer of the invention is composed of an ethylene/polyene copolymer (i) and polyethylene (ii) as described above and has a density of about 0.92 g/cm$^3$ and the intrinsic viscosity [η] of 1.8 dl/g, the melt tension of this olefin polymer is not less than 2.5 g, preferably not less than 3.5 g, more preferably not less than 4.0 g, much more preferably not less than 4.5 g, most preferably not less than 5.0 g.

The melt tension can be determined in the following manner.

Using a MT measuring machine (produced by Toyo Seiki Seisakusho K. K.), 7 g of a polymer is introduced into a cylinder having an orifice on the bottom and a piston, the cylinder being kept at a melting temperature of the polymer (polyethylene: 190° C., polypropylene: 230° C.). After 5 minutes, the piston is pushed down at a rate of 10 mm/min to extrude a molten polymer in the form of strand from the cylinder through the orifice provided on the bottom of the cylinder. The extruded strand is drawn in the form of filament, and wound up at a rate of 2.5 m/min by way of a pulley of a load detector. In this stage, a stress applied to the pulley is measured. The obtained value is a melt tension of the polymer.

The melt tension of the olefin polymer according to the invention is higher than that of olefin polymers prepared by the conventional processes. Further, the olefin polymer of the invention is excellent in rigidity, transparency, mechanical strength (e.g., impact strength) and appearance. Accordingly, when the olefin polymer of the invention is used, there can be obtained films not only showing good appearance, for example, being free from fish eye, but also having high transparency and high strength.

The olefin polymer as mentioned above is also excellent in molding properties such as inflation molding properties, and can be molded into films at a high speed with a high yield. In addition, various molding processes such as blow molding and vacuum molding can be applied to the olefin polymer, and thereby uses of the olefin polymer can be extended.

Among the olefin polymers provided by the present invention, an olefin polymer containing the α-olefin/polyene copolymer in a large amount can be favorably employed as a master batch. In the case of using the olefin polymer of the invention as a master batch, this olefin polymer is desired to contain the α-olefin/polyene copolymer (i) in an amount of 15 to 99% by weight, preferably 18 to 90% by weight, more preferably 20 to 80% by weight, and the olefin polymer (ii) in an amount of 85 to 1% by weight, preferably 82 to 10% by weight, more preferably 80 to 20% by weight.

The olefin polymer according to the invention may further contain various additives such as a heat stabilizer, a weathering stabilizer, an antistatic agent, an antiblocking agent, a lubricant, a nucleating agent, a pigment, a dye, an inorganic filler and an organic filler, in the case of necessity.

EFFECT OF THE INVENTION

The prepolymerized catalyst according to the invention is a prepolymerized catalyst obtained by copolymerizing an α-olefin and a polyene compound to [A] a transition metal compound catalyst component and [B] an organometallic compound catalyst component in the total amounts of the α-olefin and the polyene compound of 0.01 to 2,000 g per 1 g of the transition metal compound catalyst component [A]. When olefin is polymerized or copolymerized in the presence of the above prepolymerized catalyst, an olefin polymer having a high melt tension can be obtained.

The olefin polymer obtained as above can be molded into inflation films of good appearance, high transparency, high strength, etc. at a high speed with a high yield and a high moldability, because the olefin polymer has a high melt tension. Further, the olefin polymer can be molded by various molding processes such as blow molding, vacuum molding, air-pressure molding, calender molding, foam molding, extrusion molding and stretch molding and hence uses of the olefin polymer can be extended.

The present invention is further illustrated by the following examples, but the invention is in no way restricted to those examples.

EXAMPLE

EXAMPLE 1

[Preparation of solid titanium catalyst component [A]-1]

95.2 g of anhydrous magnesium chloride, 442 ml of decane and 390.6 g of 2-ethylhexyl alcohol were mixed and heated at 130° C. for 2 hours to give a homogeneous solution. Then, to the solution was added 21.3 g of phthalic anhydride, and they were mixed and stirred with each other at 130° C. for 1 hour to dissolve the phthalic anhydride in the solution. Thus obtained homogeneous solution was cooled to room temperature, and then 75 ml of the homogeneous solution was dropwise added to 200 ml of titanium tetrachloride kept at −20° C. over a period of 1 hour. After the addition was completed, the temperature of the resulting mixture liquid was raised to 110° C. over a period of 4 hours. When the temperature of the mixture liquid reached 110° C., 5.22 g of diisobutyl phthalate (DIBP) was added to the mixture liquid, and then the resulting mixture was stirred at the same temperature for 2 hours.

After the reaction was completed, a solid portion was recovered from the reaction liquid by means of hot filtration. The solid portion was suspended again in 275 ml of titanium tetrachloride, and the obtained suspension was further heated at 110° C. for 2 hours. After the reaction was completed, a solid portion was recovered again by means of hot filtration. The solid portion was well washed with decane and hexane at 110° C. until no titanium compound liberating in the solution was detected.

The solid titanium catalyst component [A]-1 prepared as above was stored as a decane slurry. A part of the slurry was dried to examine the catalyst composition. As a result, the solid titanium catalyst component [A]-1 obtained as above had a composition comprising 2.4% by weight of titanium, 60% by weight of chlorine, 20% by weight of magnesium and 13.0% by weight of DIBP.

[Preparation of prepolymerized solid titanium catalyst component [B]-1]

Into a 400 ml four-necked glass reactor equipped with a stirrer, 200 ml of purified hexane, 6 mmol of triethylaluminum and 2.0 mmol (in terms of titanium atom) of the above-obtained solid titanium catalyst component [A]-1 were charged in a nitrogen atmosphere. Then, into the reactor was further fed propylene at a rate of 6.4 liter/hour at 20° C. for 1 hour.

When feeding of the propylene was completed, the reactor was purged with nitrogen, and a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized solid titanium catalyst component [B]-1.

[Preparation of prepolymerized catalyst [I]-1]

Into a 400 ml four-necked glass reactor equipped winh a stirrer, 167 ml of purified hexane, 1 ml of 1,9-decadiene, 5 mmol of diethylaluminum chloride and 0.5 mmol (in terms of titanium atom) of the above-obtained prepolymerized catalyst [B]-1 were charged in a nitrogen atmosphere. Then, into the reactor was further fed ethylene at 0° C., and feeding of the ethylene was terminated when the ethylene was reacted in an amount of 13 liters.

When the feeding of ethylene was completed, the reactor was purged with nitrogen, and then 5 ml of the resulting slurry was sampled to measure a conversion of 1,9-decadiene and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [I]-1.

In the above procedure, ethylene and 1,9-decadiene were copolymerized in an amount of 15.3 g based on 1 g of the transition metal compound catalyst component.

The conversion of 1,9-decadiene measured by a gas chromatography was 75% and therefore the ethylene/1,9-decadiene copolymer contained constituent units derived from ethylene in an amount of 99.23 mol % and constituent units derived from 1,9-decadiene in an amount of 0.77 mol %.

[Polymerization]

Into a 2-liter autoclave, 750 ml of purified n-hexane was charged, and further 0.75 mmol of triethylaluminum, 0.75 mmol of cyclohexylmethyldimethoxysilane (CMMS) and 0.015 mmol Ti (in terms of titanium atom) of the above-obtained prepolymerized catalyst [I]-1 were charged at 60° C. in a propylene atmosphere.

Then, 200 ml of hydrogen was introduced into the autoclave, and the temperature in the autoclave was raised to 70° C., followed by keeping the same temperature for 2 hours to perform a propylene polymerization. The pressure during the polymerization was kept at 7 kg/cm$^2$-G. After the polymerization was completed, a slurry containing the produced solid was filtered and separated into a white powder and a liquid phase portion.

The yield of the white powder polymer was 362.6 g on the dry basis, and the extraction retention thereof by means of boiling heptane was 98.34%. Further, the white powder polymer had a MFR of 3.2 dg/min, an apparent bulk specific gravity of 0.45 g/ml and a melt tension of 3.7 g. On the other hand, 1.7 g of a solvent-soluble polymer was obtained by concentration of the above-obtained liquid phase portion. Accordingly, the activity was 24,300 g-PP/mM-Ti, and II (t-I.I.) in the whole product was 97.9%.

The olefin polymer obtained as above contained an ethylene/1,9-decadiene copolymer in an amount of 0.17% by weight.

The results are set forth in Table 1.

EXAMPLE 2

[Preparation of prepolymerized catalyst [I]-2]

The procedure of the prepolymerization of prepolymerized catalyst [B]-1 in Example 1 was repeated except for using 0.5 mmol of diethylaluminum chloride and 0.17 mmol (in terms of titanium atom) of the prepolymerized catalyst [B]-1 and reacting ethylene in an amount of 4.3 liters, to obtain a prepolymerized catalyst [I]-2.

In the above procedure, ethylene and 1,9-decadiene were copolymerized in an amount of 15.4 g based on 1 g of the transition metal compound catalyst component.

The conversion of 1,9-decadiene was 61% and therefore the ethylene/1,9-decadiene copolymer contained constituent units derived from ethylene in an amount of 98.05 mol % and constituent units derived from 1,9-decadiene in an amount of 1.95 mol %.

[Polymerization]

The procedure of the polymerization in Example 1 was repeated except for using the above-obtained prepolymerized catalyst [I]-2, to obtain an olefin polymer.

The olefin polymer obtained as above contained an ethylene/1,9-decadiene copolymer in an amount of 0.18% by weight.

The results are set forth in Table 1.

EXAMPLE 3

[Preparation of prepolymerized catalyst [I]-3]

The procedure of the prepolymerization of prepolymerized catalyst [B]-1 in Example 1 was repeated except for using 1.5 mmol of diethylaluminum chloride and 0.5 mmol (in terms of titanium atom) of the prepolymerized catalyst [B]-1 and reacting ethylene in an amount of 13 liters, to obtain a prepolymerized catalyst [I]-3.

In the above procedure, ethylene and 1,9-decadiene were copolymerized in an amount of 15.3 g based on 1 g of the transition metal compound catalyst component.

The conversion of 1,9-decadiene was 63% and therefore the ethylene/1,9-decadiene copolymer contained constituent units derived from ethylene in an amount of 99.36 mol % and constituent units derived from 1,9-decadiene in an amount of 0.64 mol %.

[Polymerization]

The procedure of the polymerization in Example 1 was repeated except for using the above-obtained prepolymerized catalyst [I]-3, to obtain an olefin polymer.

The olefin polymer obtained as above contained an ethylene/1,9-decadiene copolymer in an amount of 0.16% by weight.

The results are set forth in Table 1.

EXAMPLE 4

[Polymerization]

The procedure of the polymerization in Example 1 was repeated except for using 1.88 mmol of triethylaluminum, 0.188 mmol of CMMS, 0.0376 mmol (in terms of titanium atom) of the prepolymerized catalyst [I]-3 and 400 ml of hydrogen and varying the polymerization time to 50 minutes, to obtain an olefin polymer.

The melt tension of the obtained olefin polymer was unmeasurable because strands thereof were unable to be tensed in the form of a thread, so that the obtained white powder was granulated in the following manner and then the melt tension and the melt flow rate of the polymer were measured.

The olefin polymer obtained as above contained an ethylene/1,9-decadiene copolymer in an amount of 0.33% by weight.

The results are set forth in Table 1.

[Granulation]

Based on 100 parts by weight of the above-obtained white powder, 0.05 part by weight of tetrakis [methylene (3,5-di-t-butyl-4-hydroxy)hydrocinnamate]methane, 0.05 part by weight of tris (mixed mono- & di-nonylphenylphosphite) and 0.1 part by weight of calcium stearate were mixed with each other, and the resulting mixture was granulated at 200° C. using an extrusion granulator having a screw diameter of 20 mm (produced by Thermoplastic Co.).

EXAMPLE 5

[Polymerization]

The procedure of the polymerization in Example 1 was repeated except for using 0.94 mmol of triethylaluminum, 0.094 mmol of CMMS, 0.0188 mmol (in terms of titanium atom) of the prepolymerized catalyst [I]-3 and 300 ml of hydrogen and varying the polymerization time to 2 hours and 50 minutes, to obtain an olefin polymer.

The melt tension and the melt flow rate of the olefin polymer were measured after the obtained white powder was granulated in the same manner as described above.

The olefin polymer obtained as above contained an ethylene/1,9-decadiene copolymer in an amount of 0.18% by weight.

The results are set forth in Table 1.

Comparative Example 1

[Polymerization]

The procedure of the polymerization in Example 1 was repeated except for using the prepolymerized solid-titanium catalyst [B]-1 instead of the prepolymerized catalyst [I]-1 to perform a propylene polymerization.

The results are set forth in Table 1.

TABLE 1

|  | Polymerization Activity (g-PP/mM-Ti) | II (%) | MFR (dg/min) | Apparent Bulk Specific Gravity (g/ml) | MT (g) |
| --- | --- | --- | --- | --- | --- |
| Ex. 1 | 24,300 | 97.9 | 3.2 | 0.45 | 3.7 |
| Ex. 2 | 23,200 | 98.6 | 2.95 | 0.45 | 3.6 |
| Ex. 3 | 26,800 | 98.4 | 1.80 | 0.45 | 3.5 |
| Ex. 4 | 13,000 | 97.6 | 6.6 | 0.44 | 2.6 |
| Ex. 5 | 22,400 | 97.3 | 4.5 | 0.45 | 2.2 |
| Com. Ex. 1 | 28,300 | 98.6 | 3.1 | 0.45 | 0.67 |

EXAMPLE 6

[Preparation of solid titanium catalyst component [A]-2]

4.8 g of commercially available anhydrous magnesium chloride, 23.1 ml of 2-ethylhexyl alcohol and 200 ml of decane were mixed and heated at 140° C. for 3 hours to give a homogeneous solution containing magnesium chloride. Then, a mixture solution of 7.1 ml of triethylaluminum and 45 ml of decane was dropwise added to the solution under stirring at 20° C. over a period of 30 minutes, and the resulting mixture was kept at the same temperature for 1 hour. Then, the temperature of the mixture was raised to 80° C. over a period of 1 hour, and the mixture was further heated for 1 hour at the same temperature. Subsequently, to the mixture was dropwise added a mixture liquid of 7.5 ml of diethyl aluminum chloride and 52 ml of decane over a period of 30 minutes, and the resulting mixture was heated again at 80° C. for 1 hour. The produced solid portion in the reaction liquid was separated from the reaction liquid by means of filtration. Thus, a solid component containing a reducing organic group was synthesized.

The solid component obtained as above was suspended again in 200 ml of decane, and to the resulting suspension was then added 3.75 mmol of 2-ethylhexoxytitanium trichloride to react them with each other at 80° C. for 1 hour. The resulting reaction liquid was then washed with decane, to obtain a solid titanium catalyst component [A]-2.

[Preparation of prepolymerized catalyst [I]-4]

Into a 400 ml four-necked glass reactor equipped with a stirrer, 150 ml of purified hexane, 0.1 ml of 1,9-decadiene, 0.3 mmol of diethylaluminum chloride and 0.1 mmol (in terms of titanium atom) of the above-obtained solid titanium catalyst component [A]-2 were charged in a nitrogen atmosphere. Then, into the reactor was further fed ethylene at 30° C., and feeding of the ethylene was terminated when the ethylene was reacted in an amount of 3 liters. The reactor was purged with nitrogen, and then 5 5 ml of the resulting slurry was sampled to measure a conversion of 1,9-decadiene and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [I]-4.

In the above procedure, ethylene and 1,9-decadiene were copolymerized in an amount of 10.1 g based on 1 g of the transition metal compound catalyst component.

The conversion of 1,9-decadiene was 79% and therefore the ethylene/1,9-decadiene copolymer contained constituent units derived from ethylene in an amount of 99.39 mol % and constituent units derived from 1,9-decadiene in an amount of 0.61 mol %.

The melt flow rate (MFR) of the ethylene/1,9-decadiene copolymer was determined as follows. A large amount of isobutyl alcohol containing a small amount of hydrochloric acid was added to the prepolymerized catalyst [I]-4 obtained above. The resulting mixture was stirred for 30 minutes at 60° C. to remove a catalyst residue. After the stirring was completed, a slurry containing the produced solid was filtered to separate a polymer from the slurry. The polymer was dried at 70° C. under a reduced pressure to prepare an ethylene/1,9-decadiene copolymer. The melt flow rate of the thus prepared ethylene/1,9-decadiene copolymer was determined by the method as described above, namely in accordance with ASTM D1238 (polypropylene; 230° C., polyethylene: 190° C., 2.16 kg), and found to be less than the measurable lower limit (i.e., less than 0.01 dg/min).

[Polymerization ]

Into a 2-liter autoclave thoroughly purged with nitrogen, 150 g of sodium chloride was charged as a dispersing agent, and the autoclave was subjected to a reducing treatment for 2 hours using a vacuum pump with heating at 90° C. so that the internal pressure within the autoclave became not higher than 50 mmHg. Subsequently, the temperature of the autoclave was lowered to room temperature, and the autoclave was purged with ethylene. Thereafter, into the autoclave were charged 0.5 mmol of triethylaluminum, 0.5 mmol of diethylaluminum chloride and 10 ml of 1-hexene. After the reaction system was sealed up, the temperature of the reaction system was raised to 60° C., and 1.2 kg/cm$^2$ of hydrogen was fed to the system. With further application of a pressure using ethylene, 0.003 mmol (in terms of titanium atom) of the above-obtained prepolymerized catalyst [I]-4 was added to the reaction system at 70° C. During the polymerization, the temperature was kept at 80° C., and the pressure was kept at 8 kg/cm$^2$-G by the supply of ethylene gas. After the addition of the prepolymerized catalyst [I]-4, 40 ml of 1-hexene was fed to the reaction system over a period of 1 hour using a pump. The polymerization was completed in 1 hour after the addition of the prepolymerized catalyst [I]-4.

After the polymerization was completed, the content in the autoclave was introduced into water of about 1 liter. By stirring of the resulting mixture for 5 minutes, almost all of the sodium chloride was dissolved, and only a polymer was floated on the surface of water. This polymer was recovered, then well washed with methanol, and dried at 80° C. overnight, under a reduced pressure.

The olefin polymer obtained as above contained an ethylene/1,9-decadiene copolymer in an amount of 0.09% by weight.

The results are set forth in Table 2.

EXAMPLE 7

[Preparation of prepolymerized catalyst [I]-5]

The procedure of the prepolymerization in Example 6 was repeated except for using 1.0 ml of 1,9-decadiene, to obtain a prepolymerized catalyst [I]-5.

In the above procedure, ethylene and 1,9-decadiene were copolymerized in an amount of 11.0 g based on 1 g of the transition metal compound catalyst component.

The conversion of 1,9-decadiene was 60% and therefore the ethylene/1,9-decadiene copolymer contained constituent units derived from ethylene in an amount of 95.04 mol % and constituent units derived from 1,9-decadiene in an amount of 4.96 mol %.

The melt flow rate of the ethylene/1,9-decadiene copolymer was determined in the same manner as in Example 6, and found to be less than the measurable lower limit (i.e., less than 0.01 dg/min).

[Polymerization]

The procedure of the polymerization in Example 6 was repeated except for using 1.5 kg/cm² of hydrogen and using the above-obtained prepolymerized catalyst [I]-5, to obtain an olefin polymer.

The olefin polymer obtained as above contained an ethylene/1,9-decadiene copolymer in an amount of 0.10% by weight.

The results are set forth in Table 2.

EXAMPLE 9

[Preparation of prepolymerized catalyst [I]-6]

The procedure of the prepolymerization in Example 6 was repeated except for reacting ethylene in an amount of 4.5 liters, to obtain a prepolymerized catalyst [I]-6.

In the above procedure, ethylene and 1,9-decadiene were copolymerized in an amount of 15.2 g based on 1 g of the transition metal compound catalyst component.

The conversion of 1,9-decadiene was 57% and therefore the ethylene/1,9-decadiene copolymer contained constituent units derived from ethylene in an amount of 96.79 mol % and constituent units derived from 1,9-decadiene in an amount of 3.21 mol %.

The melt flow rate of the ethylene/1,9-decadiene copolymer was determined in the same manner as in Example 6, and found to be less than the measurable lower limit (i.e., less than 0.01 dg/min).

[Polymerization]

The procedure of the polymerization in Example 7 was repeated except for using the above-obtained prepolymerized catalyst [I]-6, to obtain an olefin polymer.

The olefin polymer obtained as above contained an ethylene/1,9-decadiene copolymer in an amount of 0.12% by weight.

The results are set forth in Table 2.

Comparative Example 2

[Preparation of prepolymerized catalyst [B]-2]

Into a 400 ml four-necked glass reactor equipped with a stirrer, 200 ml of purified hexane, 0.6 mmol of triethylaluminum and 0.2 mmol (in terms of titanium atom) of the above-obtained solid titanium catalyst component [A]-2 were charged in a nitrogen atmosphere. Then, into the reactor was further fed ethylene at 30° C. at a rate of 7 liter/hour for 1 hour. When feeding of the ethylene was completed, the reactor was purged with nitrogen, and a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [B]-2.

[Polymerization]

The procedure of the polymerization in Example 6 was repeated except for using 1.1 kg/cm² of hydrogen and using the above-obtained prepolymerized catalyst [B]-2 instead of the prepolymerized catalyst [I]-4, to obtain an olefin polymer.

The results are set forth in Table 2.

TABLE 2

| | Polymerization Activity (gPE/g-Cat) | MFR (dg/min) | Density (g/ml) | MT (g) |
|---|---|---|---|---|
| Ex. 6 | 11,800 | 1.04 | 0.922 | 4.9 |
| Ex. 7 | 10,600 | 1.97 | 0.920 | 4.3 |
| Ex. 8 | 12,600 | 1.07 | 0.924 | 6.0 |
| Com. Ex. 2 | 10,500 | 1.5 | 0.921 | 1.6 |

EXAMPLE 9

[Preparation of prepolymerized catalyst [I]-7]

Into a 400 ml four-necked glass reactor equipped with a stirrer, 167 ml of purified hexane, 1 ml of 1,9-decadiene, 5 mmol of triethylaluminum, 1 mmol of cyclohexylmethyldimethoxysilane (CMMS) and 0.5 mmol (in terms of titanium atom) of the solid titanium catalyst component [A]-1 prepared in Example 1 were charged in a nitrogen atmosphere. Then, into the reactor was further fed propylene at 20° C. When the propylene was reacted in an amount of 8 liters, feeding of the propylene was terminated.

When the feeding of the propylene was completed, the reactor was purged with nitrogen, and then 5 ml of the resulting slurry was sampled to measure a conversion of 1,9-decadiene, and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [I]-7.

In the above procedure, propylene and 1,9-decadiene were copolymerized in an amount of 15.2 g based on 1 g of the transition metal compound catalyst component.

The conversion of 1,9-decadiene was 38% and therefore the propylene/1,9-decadiene copolymer contained constituent units derived from propylene in an amount of 99.42 mol % and constituent units derived from 1,9-decadiene in an amount of 0.58 mol %.

The melt flow rate of the propylene/1,9-decadiene copolymer was determined in the same manner as in Example 6, and found to be less than the measurable lower limit (i.e., less than 0.01 dg/min).

[Polymerization]

Into a 2-liter autoclave, 750 ml of purified n-hexane was charged, and further 0.75 mmol of triethylaluminum, 0.75 mmol of CMMS and 0.015 mmol Ti (in terms of titanium atom) of the above-obtained prepolymerized catalyst [I]-7 were charged at 60° C. in a propylene atmosphere.

Then, 200 ml of hydrogen was introduced into the autoclave, and the temperature in the autoclave was raised to 70° C., followed by keeping the same temperature for 2 hours to perform a propylene polymerization. The pressure during the polymerization was kept at 7 kg/cm²-G. After the polymerization was completed, a slurry containing the produced solid was filtered and separated into a white powder and a liquid phase portion.

The yield of the white powder polymer was 315.0 g on the dry basis, and the residue of extraction thereof by means of boiling heptane was 98.89%. Further, the white powder polymer had a MFR of 3.9 dg/min, an apparent bulk specific gravity of 0.46 g/ml and a melt tension of 0.85 g. On the other hand, 1.9 g of a solvent-soluble polymer was obtained by concentration of the above-obtained liquid phase portion. Accordingly, the activity was 21,100 g-PP/mM-Ti, and II (t-I.I.) in the whole product was 98.3%.

The polymer obtained as above contained a propylene/1,9-decadiene copolymer in an amount of 0.21% by weight.
The results are set forth in Table 3.

EXAMPLE 10

[Preparation of prepolymerized catalyst [I]-8]

The procedure of the prepolymerization of solid titanium catalyst component [A]-1 in Example 9 was repeated except for using 5 ml of 1,9-decadiene, to obtain a prepolymerized catalyst [I]-8.

In the above procedure, propylene and 1,9-decadiene were copolymerized in an amount of 15.4 g based on 1 g of the transition metal compound catalyst component.

The conversion of 1,9-decadiene was 32% and therefore the propylene/1,9-decadiene copolymer contained constituent units derived from propylene in an amount of 97.49 mol % and constituent units derived from 1,9-decadiene in an amount of 2.51 mol %.

The melt flow rate of the propylene/1,9-decadiene copolymer was determined in the same manner as in Example 6, and found to be less than the measurable lower limit (i.e., less than 0.01 dg/min).

[Polymerization]

The procedure of the polymerization in Example 9 was repeated except for using the above-obtained prepolymerized catalyst [I]-8, to obtain a polymer.

The polymer obtained as above contained a propylene/1,9-decadiene copolymer in an amount of 0.27% by weight.
The results are set forth in Table 3.

TABLE 3

| | Polymerization Activity (g-PP/mM-Ti) | II (%) | MFR (dg/min) | Apparent Bulk Specific Gravity (g/ml) | MT (g) |
| --- | --- | --- | --- | --- | --- |
| Ex. 9 | 21,100 | 98.3 | 3.9 | 0.46 | 0.85 |
| Ex. 10 | 15,800 | 98.2 | 3.6 | 0.44 | 1.2 |

EXAMPLE 11

[Polymerization]

Into a 17-liter autoclave, 3 Kg of propylene was charged at room temperature in a propylene atmosphere, and further 20 liters of hydrogen was introduced into the autoclave, and the temperature in the autoclave was raised to 50° C. Then, into the autoclave were charged 22.5 mmol of triethylaluminum, 7.5 mmol of diphenyldimethoxysilane (DPMS) and 0.075 mmol Ti (in terms of titanium atom) of the above-obtained prepolymerized catalyst [I]-1, and the temperature was further raised to 70° C. to perform a polymerization for 36 minutes.

After the polymerization was completed, the temperature in the autoclave was lowered to room temperature and the unreacted propylene and hydrogen were purged. The amount of the unreacted propylene calculated from the volume of the purged gas was 0.9 Kg. After the polymerization system was replaced with nitrogen, a part of the produced polypropylene (PP) was sampled. The temperature in the polymerization system was raised to 60° C. and into the polymerization system were fed ethylene at a rate of 360 liter/hour and propylene at a rate of 840 liter/hour. The pressure during the polymerization was kept at 10 Kg/cm$^2$-G to perform a copolymerization at 70° C. for 60 minutes.

Immediately after the copolymerization was completed, a small amount of ethanol was added so as to decompose the catalyst, and then an unreacted ethylene, propylene and hydrogen were purged out to thereby obtain a white powder polymer. The yield of the white powder polymer after drying under a reduced pressure was 2.7 Kg.

Accordingly, the activity of the catalyst was 14850 g/g-cat and the amount of an ethylene/1,9-decadiene copolymer in the whole polymer was 0.10% by weight. The polymer had a melt flow rate (MFR) of 3.4 dg/min and a melt tension (MT) of 4.2 g. Further, the amount of a decane-soluble component in this polymer at 23° C. was 20% by weight, and the ethylene content in the decane-soluble component was 36.4 mol %.

EXAMPLE 12

[Polymerization]

Into a 2-liter autoclave, 750 ml of purified n-hexane was charged, and further 0.975 mmol of triethylaluminum, 0.975 mmol of cyclohexylmethyldimethoxysilane (CMMS) and 0.0195 mmol Ti (in terms of titanium atom) of the above-obtained prepolymerized catalyst [I]-1 were charged at 25° C. in a propylene atmosphere.

Further, 250 ml of hydrogen was introduced into the autoclave, and the temperature in the autoclave was raised to 60° C., provided that when the temperature was raised to 55° C., feeding of 7.0 mol % of ethylene and 93.0 mol % of propylene was started, followed by keeping the same temperature for 1.5 hours to perform a propylene polymerization. The pressure during the polymerization was kept at 2 Kg/cm$^2$-G. After the polymerization was completed, a slurry containing the produced solid was filtered at 50° to 55° C. and separated into a white powder and a liquid phase portion.

The yield of the thus obtained solid polymer was 174.4 g. A solvent-soluble polymer obtained by concentration of the liquid phase portion was 10.5 g. Accordingly, the activity of the catalyst was 2,700 g/g-cat and the amount of an ethylene/1,9-decadiene copolymer in the whole polymer was 0.56% by weight. The obtained polymer had a melt flow rate (MFR) of 1.5 dg/min and a melt tension (MT) of 6.9 g.

EXAMPLE 13

[Preparation of prepolymerized catalyst [B]-3]

Into a 400 ml four-necked glass reactor equipped with a stirrer, 200 ml of purified decane, 48 mmol of triethylaluminum, 9.6 mmol of trimethylmethoxysilane (TMMS) and 2.0 mmol Ti (in terms of titanium atom) of the above-obtained solid titanium catalyst component [A]-1 were charged in a nitrogen atmosphere. Then, into the reactor was further fed 120 ml of 3-methyl-1-butene at 20° C. to perform a reaction for 24 hours.

After the reaction was completed, the reactor was purged with nitrogen, and a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [B]-3.

[Copolymerization of ethylene and polyene]

Into a 400 ml four-necked glass reactor equipped with a stirrer, 334 ml of purified hexane, 2 ml of 1,9-decadiene, 10 mmol of diethylaluminum chloride and 1.0 mmol Ti (in terms of titanium atom) of the above-obtained prepolymerized catalyst [I]-3 were charged in a nitrogen atmosphere. Then, into the reactor was further fed ethylene at 0° C., and feeding of the ethylene was terminated when the ethylene was reacted in an amount of 28 liters.

When the feeding of ethylene was completed, the reactor was purged with nitrogen, and then 5 ml of the resulting slurry was sampled to measure a conversion of 1,9-decadiene, and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [I]-9 containing an ethylene/polyene copolymer (i).

In the prepolymerized catalyst [I]-9 thus obtained, an ethylene/1,9-decadiene copolymer was produced in an amount of 15.3 g based on 1 g of the transition metal compound catalyst component.

The conversion of 1,9-decadiene measured by a gas chromatography was 51% and therefore the ethylene/1,9-decadiene copolymer contained constituent units derived from ethylene in an amount of 99.48 mol % and constituent units derived from 1,9-decadiene in an amount of 0.52 mol %.

[Polymerization]

Into a 2-liter autoclave, 500 ml of purified 4-methyl-1-pentene was charged, and further 1.5 mmol of triethylaluminum, 1.5 mmol of trimethylmethoxysilane (TMMS) and 0.015 mmol Ti (in terms of titanium atom) of the above-obtained prepolymerized catalyst [I]-9 were charged at room temperature in a nitrogen atomosphere.

Then, 500 ml of hydrogen was introduced into the autoclave, and the temperature in the autoclave was raised to 50° C., followed by keeping the same temperature for 1.5 hours to perform a propylene polymerization. After the polymerization was completed, a slurry containing the produced solid was filtered and separated into a white powder and liquid phase portion.

The yield of the white powder polymer was 381.5 g on a dry weight basis, and therefore this polymer contained an ethylene/1,9-decadiene copolymer in an amount of 0.16% by weight. The powder polymer had a melt flow rate (MFR) of 0.5 dg/min and a melt tension (MT) of 32 g. On the other hand, 0.7 g of a solvent soluble polymer was obtained by concentration of the liquid phase portion. Accordingly, the activity of the catalyst was 25,400 g-polymer/mM-Ti.

Comparative Example 3

[Copolymerization of ethylene and polyene]

Into a 400 ml four-necked glass reactor equipped with a stirrer, 300 ml of purified 9-decadiene, 10 mmol of diethylaluminum chloride and 1.0 mmol Ti (in terms of titanium atom) of the above-obtained prepolymerized catalyst [B]-1 were charged in a nitrogen atmosphere. Then, into the reactor was further fed ethylene at 0° C. at a rate of 7 liter/hour for 4 hours.

When the feeding of ethylene was completed, the reactor was purged with nitrogen, and then the resulting slurry was filtered to measure the amount of an unreacted diene, and thereafter a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [I]-10 containing an ethylene/polyene copolymer (i).

In the prepolymerized catalyst [I]-10 thus obtained, an ethylene/1,9-decadiene copolymer was produced in an amount of 14.9 g based on 1 g of the transition metal compound catalyst component.

The conversion of 1,9-decadiene measured by a gas chromatography was 5.6%, and therefore the ethylene/polyene copolymer (i) contained constituent units derived from ethylene in an amount of 47.3 mol % and constituent units derived from 1,9-decadiene in an amount of 52.7 mol %.

[Polymerization]

Into a 2-liter autoclave, 750 ml of purified n-hexane was charged, and further 0.75 mmol of triethylaluminium, 0.75 mmol of cyclohexylmethyldimethoxysilane (CMMS) and 0.015 mmol Ti (in terms of titanium atom) of the above-obtained prepolymerized catalyst [I]-10 were charged at 60° C. in a propylene atmosphere.

Then, 200 ml of hydrogen was introduced into the autoclave, and the temperature in the autoclave was raised to 70° C., followed by keeping the same temperature for 2 hours to perform a propylene polymerization. The pressure during the polymerization was kept at 7 Kg/cm$^2$-G. After the polymerization was completed, a slurry containing the produced solid was filtered and separated into a white powder and a liquid phase portion.

The yield of the white powder polymer was 328.1 g on the dry basis, and the extraction retention thereof by means of boiling heptane was 98.17%. Further, the white powder polymer had a melt flow rate (MFR) of 2.8 dg/min, an apparent bulk specific gravity of 0.43 g/ml and a melt tension (MT) of 0.8 g. On the other hand, 1.8 g of a solvent-soluble polymer was obtained by concentration of the above-obtained liquid phase portion. Accordingly, the activity was 22,000 g-pp/mM-Ti, and II (t-I.I.) in the whole product was 97.6%. This polymer contained an ethylene/1,9-decadiene copolymer in an amount of 0.18% by weight.

Comparative Example 4

[Polymerization of polyene]

Into a 400 ml four-necked glass reactor equipped with a stirrer, 300 ml of purified 1,9-decadiene, 10 mmol of diethylaluminum chloride and 1.0 mmol Ti (in terms of titanium atom) of the above-obtained prepolymerized catalyst [B]-I were charged in a nitrogen atmosphere, followed by stirring at 0° C. for 4 hours.

The reactor was purged with nitrogen, and then the resulting slurry was filtered to determine a conversion of diene from the amount of an unreacted diene. The conversion of diene was found to be 0.8%. Then, a washing operation consisting of removal of the supernatant liquid and addition of purified hexane was carried out twice. Thereafter, the obtained reaction liquid was suspended again using purified hexane, and all of the resulting suspension was transferred into a catalyst bottle to obtain a prepolymerized catalyst [I]-11 containing a polyene homopolymer (i).

In the prepolymerized catalyst [I]-11 thus obtained, a polyene polymer was produced in an amount of 1.8 g based on 1 g of the transition metal compound catalyst component. The polyene homopolymer (i) was a homopolymer of 1,9-decadiene.

[Polymerization]

Into a 2-liter autoclave, 750 ml of purified n-hexane was charged, and further 0.75 mmol of triethylaluminium, 0.75 mmol of cyclohexylmethyldimethoxysilane (CMMS) and 0.015 mmol Ti (in terms of titanium atom of the above-obtained prepolymerized catalyst [I]-11 were charged at 60° C. in a propylene atmosphere.

Then, 200 ml of hydrogen was introduced into the autoclave, and the temperature in the autoclave was raised to 70° C., followed by keeping the same temperature for 1 hour to perform a propylene polymerization. The pressure during the polymerization was kept at 7 Kg/cm$^2$-G. After the polymerization was completed, a slurry containing the produced solid was filtered and separated into a white powder and a liquid phase portion.

The yield of the white powder polymer was 140.2 g on the dry basis, and the extraction retention thereof by means of boiling heptane was 98.03%. Further, the white powder polymer had a melt flow rate (MFR) of 2.1 dg/min, an apparent bulk specific gravity of 0.44 g/ml and a melt tension (MT) of 1.0 g. On the other hand, 1.1 g of a solvent-soluble polymer was obtained by concentration of the above-obtained liquid phase portion. Accordingly, the activity was 9,400 g-pp/mM-Ti, and II (t-I.I.) in the whole product was 97.3%. This polymer contained a polyene homopolymer in an amount of 0.05% by weight.

Comparative Example 5

[Preparation of prepolymerized catalyst [I]-12]

The procedure as in Example 1 was repeated except for using 1,4-hexadiene (mixture of cis- and trans-) instead of 1,9-decadiene, to thereby produce 15.2 g of an ethylene/1,4-hexadiene copolymer based on 1 g of the catalyst.

The conversion of 1,4-hexadiene measured by a gas chromatography was 89 mol %, and therefore the ethylene/1,4-hexadiene copolymer contained constituent units derived from ethylene in an amount of 98.58 mol % and constituent units derived from 1,4-hexadiene in an amount of 1.42 mol %.

[Polymerization]

The procedure as in Example 1 was repeated except for using the prepolymerized catalyst [I]-12 instead of the prepolymerized catalyst [I]-1.

The yield of the obtained white powder polymer was 381.4 g on the dry basis, and the extraction residue thereof by boiling heptane was 98.56%. Further, the white powder polymer had a melt flow rate (MFR) of 2.8 dg/min, an apparent bulk specific gravity of 0.42 g/ml and a melt tension (MT) of 0.8 g. On the other hand, 1.6 g of a solvent-soluble polymer was obtained by concentration of the above-obtained liquid phase portion. Accordingly, the activity was 25,500 g-pp/mM-Ti, and II (t-I.I.) in the whole product was 98.1%. This polymer contained an ethylene/1,4-hexadiene copolymer in an amount of 0.16% by weight.

What is claimed is:

1. An α-olefin/polyene copolymer-containing olefin polymer composition comprising:
   (i) from 0.001 to 15% by weight of an α-olefin/polyene copolymer; and
   (ii) from 99.999 to 85% by weight of an olefin polymer other than copolymer (i);
   wherein in copolymer (i) the polyene is an aliphatic polyene having 7 or more carbon atoms and having an olefinic double bond at both terminals, and the α-olefin/polyene copolymer (i) contains constituent units derived from the α-olefin in an amount of 99.999 to 70 mol % and contains constituent units derived from the polyene in an amount of 0.001 to 30 mol %, and
   the olefin polymer (ii) is a polymer of olefin monomer having 3 or more carbon atoms, wherein said olefin monomer is polymerized in the presence of a prepolymerized catalyst containing the α-olefin/polyene copolymer (i).

2. An α-olefin/polyene copolymer-containing olefin polymer composition having comprising:
   (1) from 0.001 to 15% by weight of an α-olefin/polyene copolymer; and
   (ii) from 99.999 to 85% by weight of an olefin polymer other than copolymer (i);
   wherein in copolymer (i) the polyene is an aliphatic polyene having 7 or more carbon atoms and having an olefinic double bond at both terminals, and the e-olefin/polyene copolymer (i) contains constituent units derived from the α-olefin in an amount of 99.999 to 70 mol % and contains constituent units derived from the polyene in an amount of 0.001 to 30 mol %, and
   the olefin polymer (ii) is a polymer of ethylene, wherein the ethylene is polymerized in the presence of a prepolymerized catalyst containing the α-olefin/polyene copolymer (i).

3. The olefin polymer composition as claimed in claim 1 or 2 wherein the polyene is a straight-chain aliphatic polyene having 7 or more carbon atoms and having an olefinic double bond at both terminals.

4. The olefin polymer composition as claimed in claim 1 wherein said olefin polymer (ii) is obtained by polymerizing or copolymerizing the olefin monomer in the presence of a catalyst for olefin polymerization, said catalyst comprising:
   (I) the prepolymerized catalyst obtained by prepolymerizing an α-olefin and said polyene compound to:
   (A) a transition metal compound catalyst component containing at least one transition metal selected from the group consisting of Ti, Zr, Hf, Nb, Ta, Cr and V, and
   (B) an organometallic compound co-catalyst component containing a metal selected from metals in Group I to Group III of the periodic table,
   in the total amounts of the α-olefin and the polyene compound of 0.01 to 2,000 g per 1 g of the transition metal compound catalyst component (A); and (II) an organometallic compound co-catalyst component containing a metal selected from metals in Group I to Group III of the periodic table.

5. The olefin polymer composition as claimed in claim 2 wherein said olefin polymer (ii) is obtained by polymerizing or copolymerizing ethylene in the presence of a catalyst for olefin polymerization, said catalyst comprising: (I) the prepolymerized catalyst obtained by prepolymerizing an α-olefin and said polyene compound to:
   (A) a transition metal compound catalyst component containing at least one transition metal selected from the group consisting of Ti, Zr, Hf, Nb, Ta, Cr and V, and
   (B) an organometallic compound co-catalyst component containing a metal selected from metals in Group I to Group III of the periodic table,
   in the total amounts of the α-olefin and the polyene compound of 0.01 to 2,000 g per 1 g of the transition metal compound catalyst component (A); and (II) an organometallic compound co-catalyst component containing a metal selected from metals in Group I to Group III of the periodic table.

6. The olefin polymer composition as claimed in claim 4 or claim 5 wherein said catalyst further comprises (III) an electron donor.

7. The olefin polymer composition as claimed in claim 4 or claim 5, wherein the transition metal compound catalyst component (A) is a solid titanium catalyst component containing titanium and halogen.

8. The olefin polymer composition as claimed in claim 4 or claim 5, wherein the transition metal compound catalyst component (A) is a metallocene compound containing a ligand having a cyclopentadienyl skeleton.

9. The olefin polymer composition according to claim 1 or 2 wherein the weight percentage (C) of the α-olefin/polyene copolymer (i), the melt tension (MT) of the α-olefin/polyene copolymer (i) and the melt tension ($MT_o$) of the olefin polymer (ii) satisfy the following equation:

$$\frac{(MT)}{(MT_0)} \geq \frac{1}{5} \log(C) + 2.00.$$

10. The olefin polymer composition of claim 1 or claim 2 wherein the α-olefin/polyene copolymer (i) is selected from the group consisting of copolymers of ethylene and 1,7-octadiene, ethylene and 1,9-decadiene, ethylene and 1,13-tetradecadiene, ethylene and 1,5,9-decatriene, propylene and 1,7-octadiene, propylene and 1,9-decadiene, propylene and 1,13-tetradecadiene, propylene and 1,5,9-decatriene, butene and 1,9-decadiene, butene and 1,5,9-decatriene, 4-methyl-1-pentene and 1,9-decadiene, 3-methyl-1-butene and 1,9-decadiene, 1-eicosene and 1,9-decadiene, propylene and 1,4-divinylcyclohexane and butene and 1,4-divinylcyclohexane, said α-olefin/polyolefin copolymer having a melt flow rate of no more than 0.1 dg/min.

11. The olefin polymer composition of claim 1 or claim 2 which contains the α-olefin/polyene copolymer (i) in an amount of from 0.008 to 10% by weight and the olefin polymer (ii) in an amount of from 99.992 to 90% by weight.

12. The olefin polymer composition of claim 11 wherein the α-olefin/polyene copolymer (i) contains constituent units derived from the polyene in an amount of from 0.01 to 20% by mole and constituent units derived from the α-olefin in an amount of from 99.99 to 80% by mole.

13. The olefin polymer composition of claim 1 wherein the α-olefin of copolymer (i) is ethylene and the olefin polymer (ii) is polypropylene, and wherein the melt tension and the melt flow rate satisfy the following relation:

$$log[MT] \geq -0.8\ log[MFR] + 0.8.$$

14. The olefin polymer composition of claim 1 wherein the α-olefin of the copolymer (i) is an e-olefin of three or more carbon atoms and wherein the olefin polymer (ii) is polypropylene, and wherein the melt tension and the melt flow rate satisfy the following relation:

$$log[MT] \geq -0.8\ log[MFR] + 0.40.$$

15. The olefin polymer composition according to claim 13 having a melt flow rate (MFR) of from about 0.5 g/10 min to about 6 g/10 min, and a melt tension (MT) of from about 2.2 g to about 32 g.

16. The polymer composition according to claim 13 having an intrinsic viscosity (η) in the range of 0.1 to 15 dl/g, and wherein the melt tension and intrinsic viscosity (η) satisfy the following relation:

$$log[MT] \geq 3.7\ log\ (\eta) - 1.3.$$

17. The olefin polymer composition according to claim 14 wherein the intrinsic viscosity, as measured in decalin at 135°, is in the range of from 0.1 to 15 dl/g, and wherein the melt tension MT and the intrinsic viscosity (η) satisfy the following relation:

$$log[MT] \geq 3.7\ log\ (\eta) - 1.45.$$

* * * * *